United States Patent [19]
Dambacher

[11] Patent Number: 5,521,943
[45] Date of Patent: May 28, 1996

[54] COFDM COMBINED ENCODER MODULATION FOR DIGITAL BROADCASTING SOUND AND VIDEO WITH PSK, PSK/AM, AND QAM TECHNIQUES

[75] Inventor: Paul Dambacher, Ampfing, Germany

[73] Assignee: Rohde & Schwarz GmbH & Co. K.G., Munich, Germany

[21] Appl. No.: 122,360

[22] Filed: Sep. 17, 1993

[30] Foreign Application Priority Data

Sep. 21, 1992 [DE] Germany .......................... 42 31 536.0
Mar. 3, 1993 [DE] Germany .......................... 43 06 590.2

[51] Int. Cl.$^6$ .......................... H04L 27/04; H04L 27/12; H04L 27/20
[52] U.S. Cl. .......................... 375/295; 375/285; 375/308; 375/296; 370/20; 455/103; 348/724
[58] Field of Search .......................... 370/18, 19, 20, 370/21, 50, 69.1, 70, 97, 75, 37; 375/260, 283, 259, 295, 296, 298, 299, 303, 361, 272, 267, 275; 348/419, 724

[56] References Cited

U.S. PATENT DOCUMENTS

| | | | |
|---|---|---|---|
| 4,029,903 | 6/1977 | Tamburelli | 375/332 |
| 5,283,780 | 2/1994 | Schuchman et al. | 370/50 |
| 5,333,155 | 7/1994 | Dambacher | 375/240 |
| 5,430,492 | 7/1995 | Dambacher | 348/469 |

OTHER PUBLICATIONS

"Digital Audio Broadcasting", ITU–COM, Oct. 1989, Genf, 4 pages.
"Künftige Systeme der digitalen Hörfunkübertragung", Bayerischer Rundfunk, Nov. 1990, pp. 5–18.
"A Universal Subband Coding System Description", CCETT, IRT, Matsushita, Philips, pp. 1–5.
"Digitale Modulationsverfahren", Rudolf Mäusl, Hüthig Verlag Heidelberg, pp. 234–244.
"The DigiCipher HDTV Broadcast System", J. A. Heller et al, General Instrument Corporation, Montreux Record (1991), pp. 595–600.
"Digital HDTV on Cable", M. Miller, Jerrold Communications, USA, Montreux Record (1991), pp. 427–432.
"The All–Digital Spectrum–Compatible HDTV System", W. C. Luplow et al, Zenith Electronics Corp., Montreux Record (1991), pp. 169–184.
"An Experimental Digital TV System For Satellite News Gathering (SNG)", M. Cominetti et al, RAI, Telettra S.p.A., Montreux Record (1991), pp.721–734.
"Analoge Modulationsverfahren", Rudolf Mäusl, Hüthig Verlag, p. 55.
"Digital Satellite Radio", Neues von Rohde & Schwarz, No. 114, p. 14.
Data Sheet of the DSR Modulator SFP, Rohde & Schwarz, 4 pages.

*Primary Examiner*—Young T. Tse
*Assistant Examiner*—William Luther
*Attorney, Agent, or Firm*—Hill, Steadman & Simpson

[57] ABSTRACT

In a digital broadcasting transmitter network system operating on a DAB principle, in which: digital programs to be broadcast via individual transmitting stations after corresponding data reduction are coded and modulated in accordance with COFDM technique; data of digital sound and/or video programs is packed into a plurality of COFDM signal packets and transmitted via a transmitting station; and/or two or three 4 PSK-COFDM coders having their outputs combined via an adder stage are used for producing individual COFDM signal packets so that the data quantity to be transmitted can be increased. Feeding of increased data quantity may take place via digital satellite channels under a DSR principle at higher-order modulation.

23 Claims, 28 Drawing Sheets

FIG.15

| BIT RATE (Mbit/s) | n.PSK n= | BANDWIDTH (MHz) | NUMBER OF TV CHANNELS | COMMENTS |
|---|---|---|---|---|
| 2×10.24 | 4 | ±7 | 2 | PRESENT STANDARD |
| 4×10.24 | 16/8PSK/2AM | ±7 | 2 | DUAL DATA RATE |
| 4×5.12 | 16/8PSK/2AM | ±3.5 | 1 | ONLY 1 TV CHANNEL |
| 2×5.12 | 4 | ±3.5 | 1 | ½ DATA RATE |

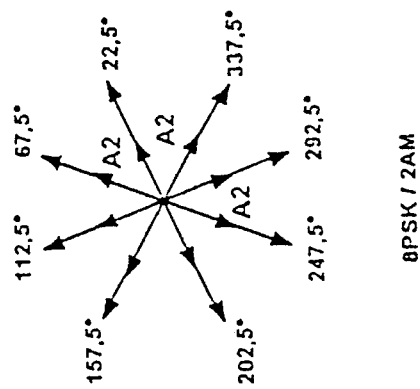
FIG.16C
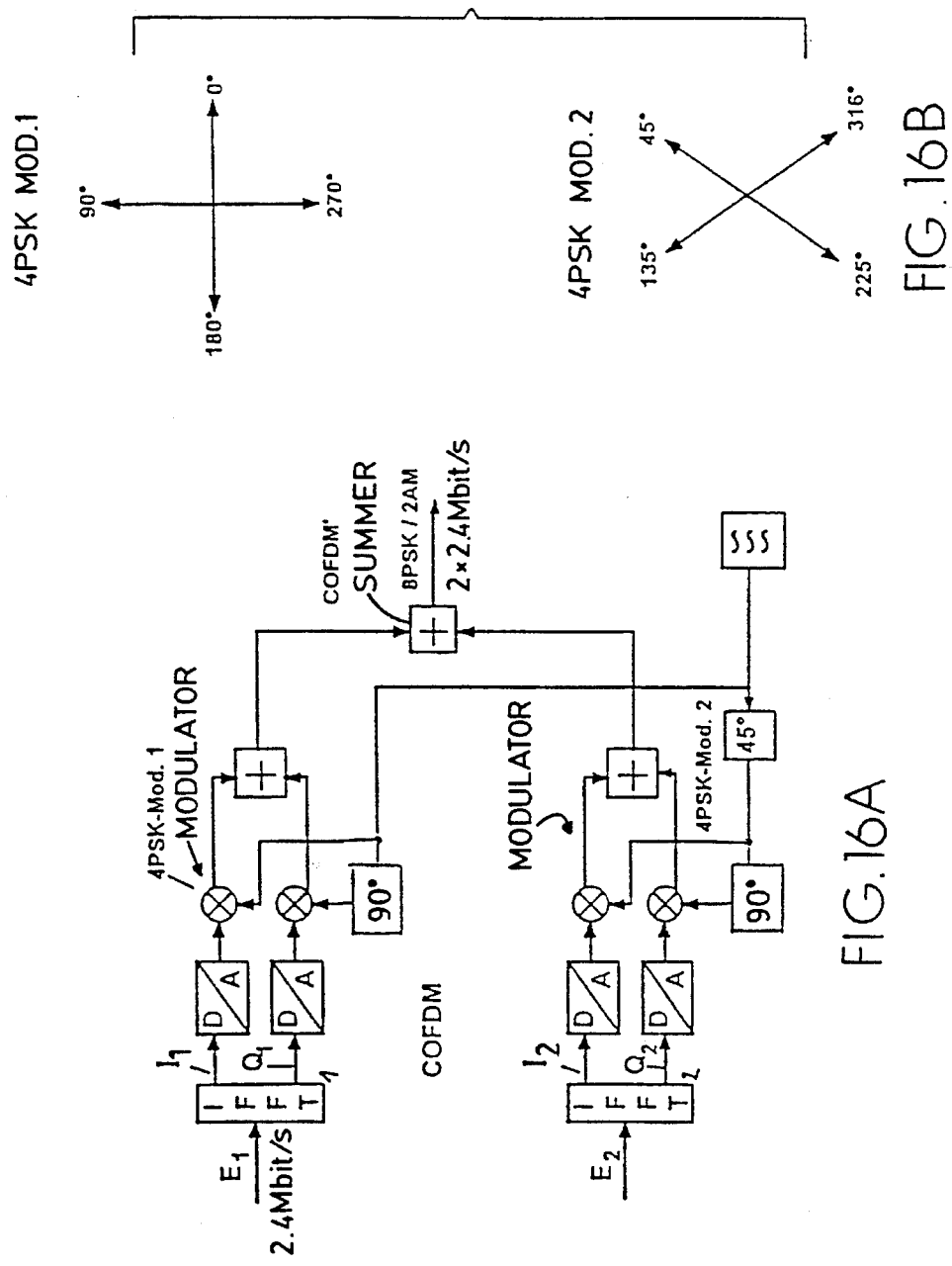
FIG.16B
FIG.16A

FIG. 17

DAB-IDENTIFICATION: 2.4 Mbit/s    INPUT DATA RATE
256 µs    PROTECTION INTERVAL
1536    CARRIER
1.5MHz    BANDWIDTH

4PSK $$\frac{1.5\text{MHz}}{1536 \text{ CARRIER}} = 0.977 \text{kHz/CARRIER} \triangleq 1.024\text{ms PERIOD}$$

1.024ms + 256 µs = 1.26ms SYMBOL DURATION

DUE TO 4PSK $\Rightarrow$ 640 µs    DUE TO 8PSK/2AM $\Rightarrow$ 320 µs $$\frac{1536 \text{ CARRIER}}{640 \text{ µs}} \Rightarrow 2.4 \text{ Mbit/s} \qquad \frac{1536 \text{ CARRIER}}{320 \text{ µs}} \Rightarrow 4.8 \text{ Mbit/s}$$

FIG. 18

Transmission Characteristics

| | Narrow MUSE* | DigiCipher* | DSC-HDTV* | AD-HDTV* | CC-DigiCipher° |
|---|---|---|---|---|---|
| Encoder Input Video Data Rate (Mb/s) | 246.344 | 405.0985 | 745.7495 (9 bits used per pixel) | 517.8016 | 1,325.7769 |
| Compressed Video Data Rate (w/o FEC) | 4.86 MHz Analog Baseband | 18.24 Mb/s (13.34 Mb/s w/16-QAM option) | 8.46-16.92 Mb/s Variable Rate | 17.73 Mb/s | 19.26 Mb/s (estimate) |
| Compression Ratio | 5.49:1 | 22.21:1 | 44.08-88.15:1 | 29.21:1 | 68.85 |
| Modulation | Split-Channel VSB-AM/SSB-AM | 32-QAM (16-QAM option) | Dispersed 4-VSB/2-VSB | Spectrally Shaped QAM (32-QAM) | 32-QAM (16-QAM option) |

\* Data derived from published information of the proponents.
° Data supplied privately prior to publication.

Comparison of the U.S. proposals at ATTC (Advanced Television Test Center) from "1125 / 60 High Definition Origination.
In The Era of Conversion to Advanced Television", S.7.
Washington, DC 20036 1625 LSt.NW

FIG.19

| CHANNEL DATA RATE (Mbit/s) | n*COFDM-PACKETS | | TV CHANNELS (BANDWIDTH) | COMMENTS |
|---|---|---|---|---|
| | 4PSK | 8PSK/2AM | | |
| 1x2.4 | 1 | | 1/4 | STANDARD DAB |
| 4x2.4 | 4 | | 1 | E.G. FOR VADIS WITH 10Mbit/s (CORRESPONDING STANDARD FOR FEEDING) |
| 8x2.4 | 8 | | 2 | E.G. HDTV-DIG (U.S.-PROPOSALS) |
| 2x2.4 | | 1 | 1/4 | |
| 8x2.4 | | 4 | 1 | E.G. HDTV-DIG (U.S.-PROPOSALS) |
| 16x2.4 | | 8 | 2 | TOTAL 38.4Mbit/s E.G. HDTV-DIG WITH 34Mbit/s (EU-PROPOSAL) |
| 0.387 | $\frac{204}{1536}$ | | (200kHz) | NARROWBAND 4PSK |
| 0.762 | | $\frac{204}{1536}$ | (200kHz) | NARROWBAND 8PSK/2AM |

$B_{HF} \approx 0.65 \cdot f_{Bit}$ bei 4-PSK power density distribution and bandwidth requirements at 2-PSK and at 4-PSK ($f_{Bit} \rightarrow f_{Schmitt} = 1/2 \cdot f_{Bit}$)

$T_{BIT} = \dfrac{1}{20.48 \text{ Mbit/s}} \cong 50\text{ns}$ $B_{HF} \approx 0.65 f_{BIT}/4PSK \approx 0.65 \times \dfrac{1}{50\text{ns}} = 13\text{MHz}$

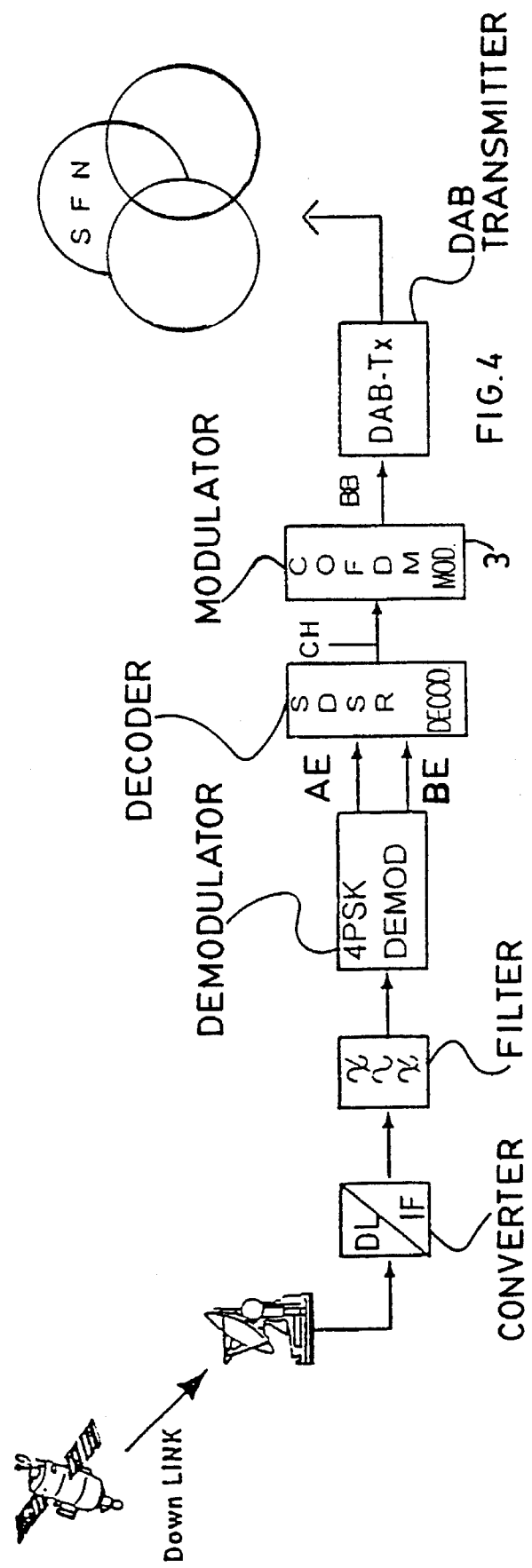

COFDM COMBINED ENCODER MODULATION FOR DIGITAL BROADCASTING SOUND AND VIDEO WITH PSK, PSK/AM, AND QAM TECHNIQUES

BACKGROUND OF THE INVENTION

The DAB broadcasting system (Digital Audio Broadcasting, described in ITU COM '89, Geneva, Oct. 1989, and in Künftige Systeme der digitalen Hörfunkübertragung", Bayerischer Rundfunk, November 1990) has been developed to permit servicing of individual regions with a plurality of broadcasting programs. The DAB system provides a multiplicity of individual synchronized transmitters each of which respectively transmits six digital stereo sound signals in bit-synchronism in a COFDM signal packet (Coded Orthogonal Frequency Division and Multiplexing). Under the COFDM principle the digital data stream of the stereo signal is divided prior to transmission into a multiplicity of subsignals each of which is separately transmitted by a single carrier. In the receiver these subsignals are recombined to result in an overall information of the digital stereo signal. It is a further feature of the DAB system that the stereo signals to be transmitted, prior to COFDM processing, are correspondingly reduced with regards to their data quantity in accordance with a method that utilizes the psycho-acoustic phenomena of the human ear (MUSICAM= Masking Universal Subband Integrated Coding and Multiplexing, described in "An Universal Subband Coding System Description", CCETT IRT Matsushita and Philips).

This DAB system which was developed for audio broadcasting exhibits extremely good transmission characteristics. Moreover, it solves the problem of distortions of the radio signals in such synchronized networks due to transmission distances of different lengths and the resulting expected interferences.

SUMMARY OF THE INVENTION

It is an object of the present invention to provide a highly-developed DAB transmission network system that is also suitable for transmitting a greater data quantity than the prior art six digital stereo-sound signals. It is a further object of the present invention to provide a simple system for supplying such an increased data quantity to the individual transmitting stations of the transmission network.

In general terms the present invention is a digital broadcasting transmitter network system operating on the DAB principle. Digital programs to be broadcast through individual transmitting stations subsequent to corresponding data reduction are coded and modulated in accordance with the COFDM technique. For increasing the data quantity to be transmitted, the data of the digital programs to be broadcast are distributed to a plurality of COFDM signal packets and a respective plurality of the COFDM signal packets is simultaneously transmitted through the individual transmitting stations, and/or, for producing the COFDM signal packets, two or more COFDM coders each having 4 PSK modulators are used and have outputs which are combined through adder stages such that 8 PSK/2 AM modulation, 16 QAM modulation or 64 QAM modulation with more than four phase positions results.

With the system according to the present invention it is possible to transmit a greater amount of data by the respective broadband transmitter of the individual transmitting stations to the consumer receivers. Thus, it becomes possible for each transmitting station either to broadcast more than six programs simultaneously or even to broadcast a TV signal right up to HDTV quality. The data quantity of the TV signals after appropriate data reduction in accordance with psycho-optical models is either divided into a plurality of signal packets or a higher-order modulation mode (8 PSK/2 AM or 16 QAM or 64 QAM) generated with the aid of commercially available COFDM coders with 4 PSK modulators is utilized. It is possible in either case to transmit a substantially greater data quantity than with the conventional DAB method by the individual transmitting stations. To this end it is merely necessary that corresponding converters are provided in the consumer receivers for combining the signal packets having the entire data, or that a corresponding demodulator is used for the provided higher-order PSK/QAM modulation.

Both of the above measures may be taken either individually or, by preference, in combination, and in this way a further multiplication of the data quantity to be transmitted will become possible.

The use of 4 PSK-COFDM coders/modulators as provided with the DAB system and now commercially available for generating the higher-order modulation modes will permit a particularly simple and low-cost realization of the desired increase in the data quantity to be transmitted. This is because it is merely necessary to interconnect a plurality of such commercially available 4 PSK modulators via an adder circuit while it is not necessary to develop a new modulator. Rather, use may be made of devices which have already been developed for the DAB principle. The principle according to the present invention may be used for all three modes 1, 2 and 3 of the COFDM packet each of which operates with a different number of carriers. In the simplest case two commercially available 4 PSK-COFDM coders/modulators, the carriers of which are respectively offset by 45° relative to each other, are directly combined in an adder circuit so that a novel 8 PSK/2 AM-modulation (Phase Shift Keying with 8 phase positions and 2 additional amplitude stages) is established. A further embodiment of the present invention resides in performing a 16 QAM or 64 QAM modulation with such commercially available coders/modulators, and to this end a single adder circuit is also required.

Higher-order modulation modes with more than 4 phase positions are known for single carriers (for example "Digitale Modulationsverfahren" by Rudolf Mäusl, Hüthig Verlag, pp.234–244). With the 8 PSK modulation method described therein (p.234) the amplitude modulation is suppressed in contrast to the feature of the present invention, and the 8 PSK/2 AM modulation is novel with respect thereto by utilizing two additional amplitude stages for data transmission. The use of the proposed novel 8 PSK/2 AM modulation or, respectively, the choice of the 16 QAM or 64 QAM modulation, which is known for single carriers, for modulating the multi-carrier of the COFDM principle offers the advantage that these modulation modes may be established with 4 PSK modulators. In all three chosen modulation methods it is possible to achieve a highly advantageous ratio of carrier performance to noise (C/N ratio) relative to the data transmission capacity.

For the transmission of the increased data quantity to the individual transmitting stations there exist various possibilities. It has proven particularly advantageous to base the transmission on the known DSR-satellite transmission system.

The system of a modified DSR-satellite transmission technique, which is suitable for transmitting a substantially greater data quantity than was previously the case, can not only be used for feeding the DAB station network system but is equally well suited for use in conjunction with the conventional DAB technique. It is thereby made possible, for example, not only to transmit four COFDM packets of six audio programs each to the individual synchronized transmitting stations of the DAB network but to transmit, for example, twice that number of COFDM packets. Hence, there are more COFDM packets available for choice at the individual stations of the DAB network from among which then, of course, only one packet comprising six respective programs will be broadcast in accordance with the conventional DAB principle.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

FIG. 15 is a table depicting DSR variance for different PSK;

FIGS. 16a, 16b and 16c depict an embodiment of the present invention having two DAB-COFDM coders/modulators with vector diagram coordinant offset by 45°;

FIG. 17 is a table illustrating parameters for DAB with 8 PSK/2 AM;

FIG. 18 is a table of transmission characteristics;

FIG. 19 is a chart depicting channel data rate;

FIG. 24 depicts the DAB transmitter station for use with the FIG. 22 embodiment;

DESCRIPTION OF THE PREFERRED EMBODIMENTS

Figure 1:
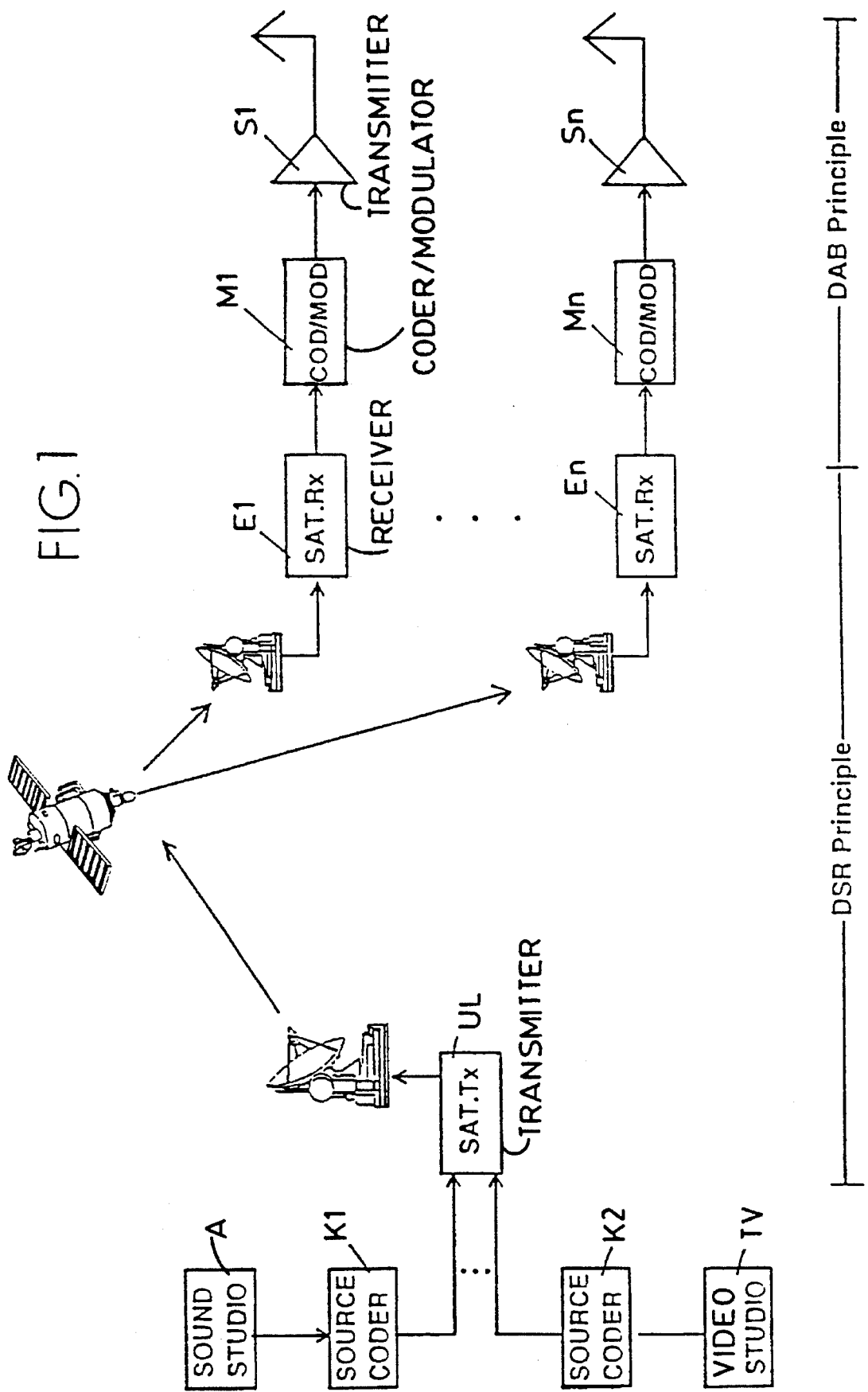
FIG. 1 depicts a basic circuit of a DAB transmission station network according to the present invention.

FIG. 1 is the basic circuit diagram of a DAB transmission station network modified in accordance with the present invention. The synchronized transmitter network has a plurality of transmitters S1 to Sn which are fed with the programs intended for broadcasting via a satellite link SAT. In the illustrated embodiment the audio signals A to be transmitted are initially reduced in a coder K1 as to their digital data flow in accordance with a technique which utilizes the psycho-acoustic phenomena of the human ear, for instance in accordance with MUSICAM (Masking Universal Subband Integrated Coding and Multiplexing, described in "MUSICAM an Universal Subband Coding System Description" by CCETT, IRT, Matsushita and Philips). The audio signals are then transmitted via the satellite transmitter UL to the satellite receivers E1 to En. Similarly, digital television signals TV may be transmitted via a corresponding coder K2, where their data flow is data-reduced in accordance with a technique utilizing the psycho-optical phenomena of the human eye, via the satellite transmitter UL to the receivers E1 to En. Such a satellite transmission technique is preferentially the DSR-technique.

Prior to the transmission of these audio or video programs via the transmitters S1 to S2 the COFDM signal packets are generated in accordance with the known DAB method in a corresponding coder/modulator M1 to Mn, in which every signal packet corresponds to a data set of 2.4 Mbit/s and a bandwidth of 1.5 MHz. In the classic DAB audio broadcasting system six digital stereo-sound signals are integrated in a signal packet and are transmitted after corresponding modulation via the transmitter S1 to Sn in bit synchronism. In classic DAB audio broadcasting every transmitter S1 to Sn transmits only one of these signal packets, hence the broadcast data quantity is limited to 2.4 Mbit/s in the known system.

In many cases it is, however, desirable and advantageous to transmit an increased data quantity via such an already existing DAB broadcasting transmitter network or a novel digital broadcasting transmitter network also in accordance with FIG. 1 by means of the transmitters S1 to Sn. Such transmission of increased data quantity is advantageous for increasing the number of broadcast audio programs to more than six or even for broadcasting television signals up to HDTV quality through the synchronized transmitter network or via an individual transmitter.

Figure 2:
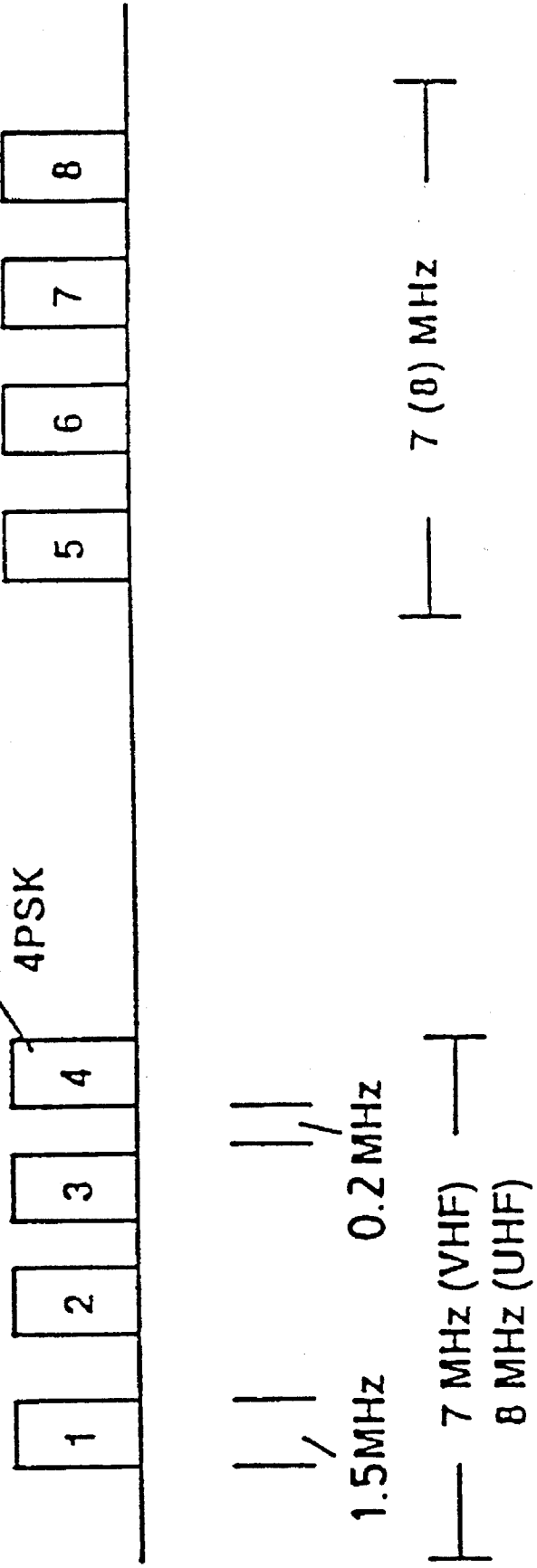
FIG. 2 depicts the 8 signal packets for transmission in the FIG. 1 embodiment.

In order to make this possible the present invention provides that the transmitters S1 to S1 are designed to be wideband, and the stages succeeding the output stage are either made correspondingly-wideband or are not used. At the same time, the coder/modulator M1 to Mn for each transmitter is designed such that not only one COFDM signal packet is transmitted but, for example, a total of eight signal packets are transmitted, as is shown schematically in FIG. 2. In accordance with the known DAB technique the coder M1 to Mn produces from the transmitted and already data-reduced audio or video signals a total of eight COFDM signal packets 1 to 8 in accordance with the COFDM technique with Subsequent 4 PSK modulation, each of the eight packets has a data quantity of 2.4 Mbit/s and each having a width of 1.5 MHz with gaps of 0.2 MHz therebetween. Under the DAB principle every signal packet consists, for example, of 1536 discrete carriers each of which is 4 PSK-modulated. Four such respective signal packets can be accommodated in a signal pattern of 7 MHz, hence all eight packets can be accommodated, for example, in two adjacent transmission channels. In this way it is possible, for instance, to broadcast up to 8×6=48 individual programs via one and the same transmitter S1 to Sn in the synchronized transmitter network. FIG. 2 also shows that it is possible in this way also to transmit two television signals TV-CH I and TC-CH II because in each channel respectively consisting of four COFDM signal packets a total data quantity of 4×2.4 Mbit/s=9.6 Mbit/s may be transmitted, which already corresponds approximately to PAL/D2-MAC or PAL-plus quality, respectively. It would also be possible to transmit only a single television signal through the total of eight signal packets, because in that case there would already be a data quantity of 19.2 Mbit/s available and techniques are actually available by means of which high-definition HDTV signals can be data-reduced to a magnitude of 20 Mbit/s. In this way it is therefore possible to transmit a television signal of HDTV (high definition television) picture quality on two TV channels.

Various proposals have already been made towards data reduction of digital television picture signals. All such proposals operate on the principle of baseband encoding with data reduction by making use of the psycho-optical phenomena of the human eye similar to the MUSICAM data reduction technique, which in the field of audio broadcasting utilizes the psycho-acoustical phenomena of the human ear. With this technique it is possible even for digital television signals of HD-quality, i.e. for television signals having an image format of 16:9 and high-definition line structures with a line number of about 1000 or more (digital HDTV signals), to reduce the data rate to less than 20 Mbit/s. Under the DigiCipher technique (Jarrold A. Heller & Woo H. Paik, General Instrument Corporation, U.S.A., "The DigiCipher HDTV Broadcast System", Montreux Record 1991; Dr. Matthew Miller, Jerrold Communications, U.S.A., "Digital HDTV on Cable", Montreux Record 1991) a data reduction for baseband and channel encoding to a total of 19.43 Mbit/s is possible. Under the DSC-HDTV technique (Wayne C. Luplow and Pieter Fockens, Zenith Electronics Corporation, U.S.A., "The All-Digital Spectrum Compatible HDTV System", Montreux Record 1991) a data rate of 21.5 Mbit/s can be achieved. According to Dig. TV for SNG (M. Cominetti, S. Chucci, A. Morello, B. Sacco, RAI, Telettra S.p.A., Italy, "An Experimental Digital TV System for Satellite News Gathering (SNG)", Montreux Record 1991) a data reduction rate to a similar extent can be achieved.

Another possibility for increasing the data quantity to be broadcast resides in that the individual COFDM signal packets are produced in the coders M1 to Mn at a PSK modulation making use of more than four phase positions so that every single signal packet will transmit, for instance, twice the data quantity. The latter possibility may, of course, also be combined with the first-mentioned one of transmitting several signal packets in parallel and simultaneously and to accommodate the data quantity for transmission in a plurality of packets. Details of this possibility of 16 PSK-modulation, for example, will be apparent from the following description of the satellite transmission link.

If it is required to broadcast a greater data quantity via the individual transmitters S1 to Sn it is of course also necessary that a greater data quantity be transmitted from the studios to the various transmitters via the satellite transmission link. To this end there are various possibilities.

A first possibility is to use the satellite link 30/20 GHz of the telecommunication satellite Kopernikus, which link is offered by Bundespost Telekom for field trials in conjunction with such DAB audio broadcasting networks.

By appropriate modification of this satellite link the same may also be utilized for the purpose of the present invention for the simultaneous transmission of a total of four COFDM signal packets, i.e. with a data quantity amounting to a total of 9.6 Mbit/s.

Figure 3:
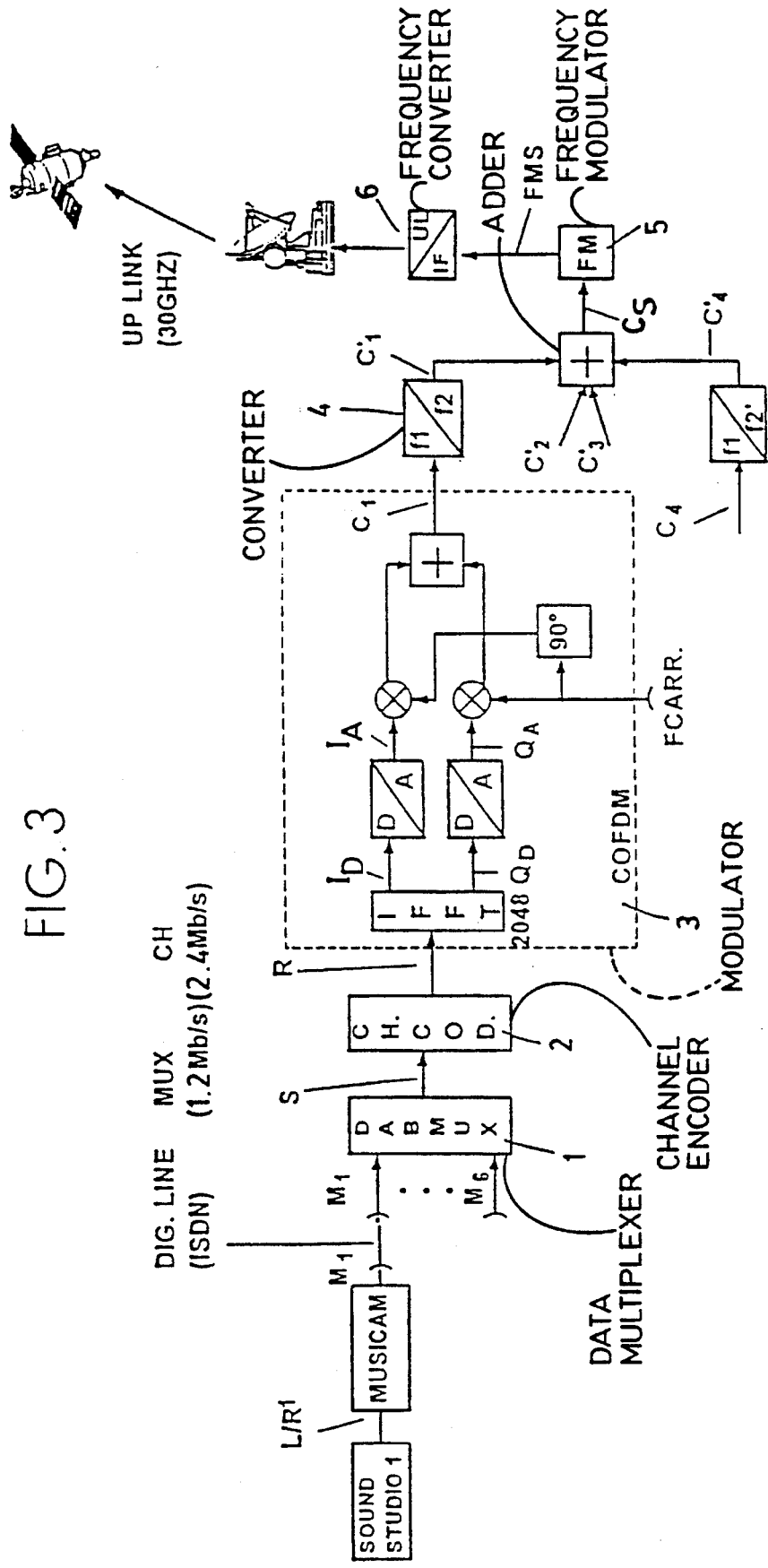
FIG. 3 depicts one embodiment of the present invention for transmitting the satellite signal.
Figure 4:
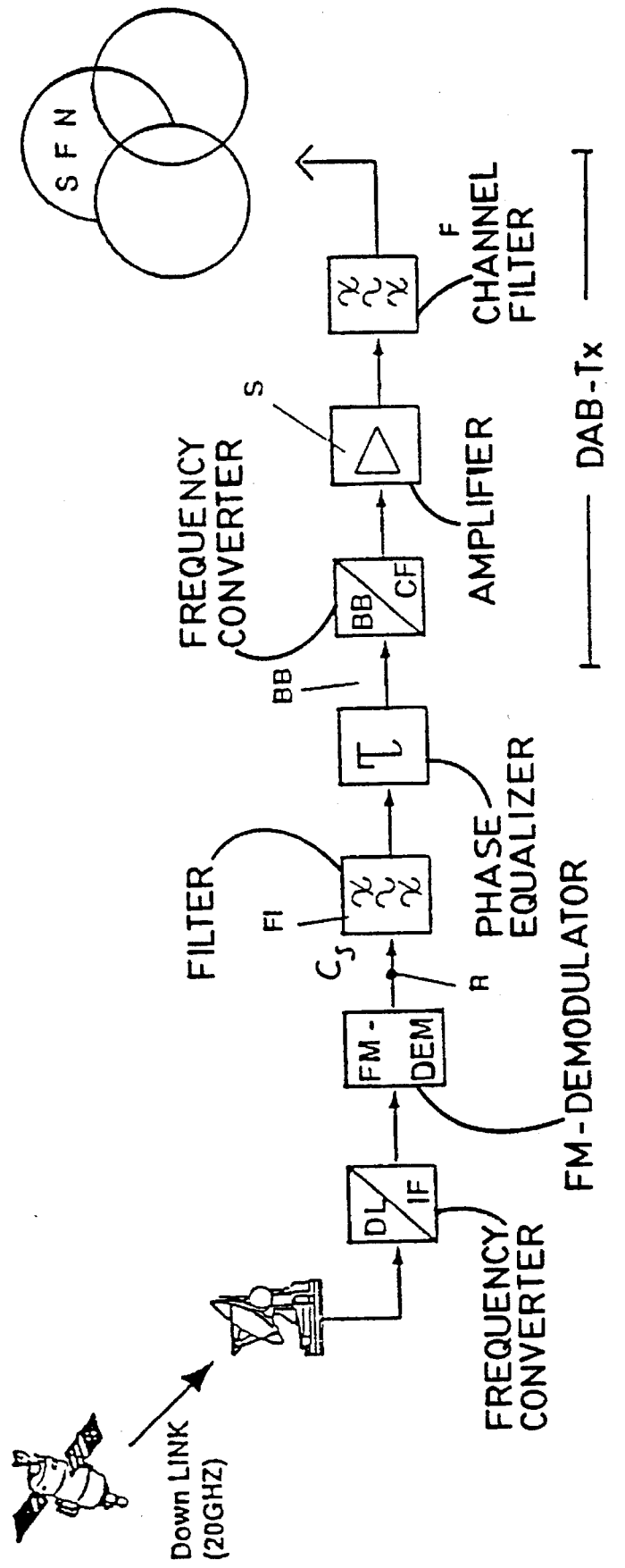
FIG. 4 depicts a DAB broadcasting station for use with the FIG. 3 embodiment.
Figure 5:
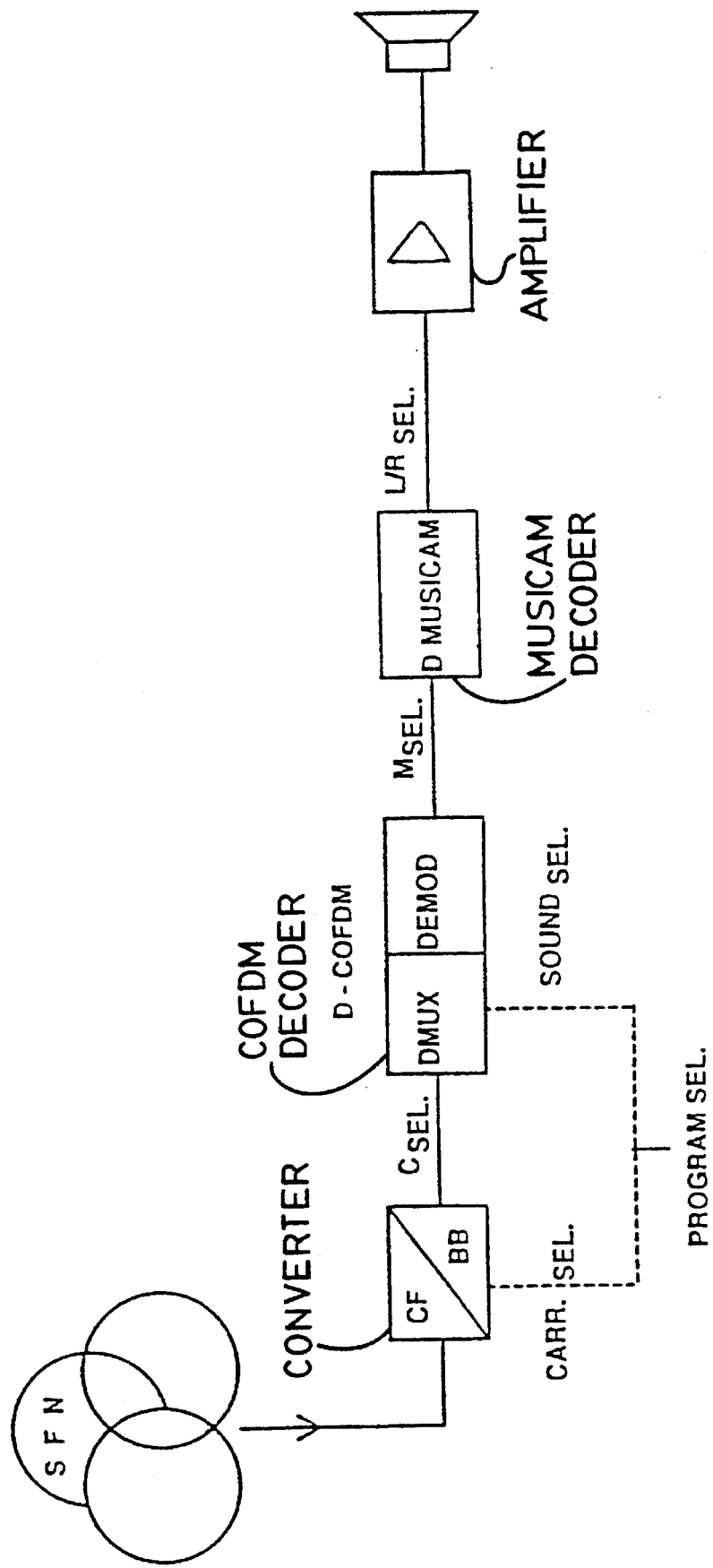
FIG. 5 depicts a DAR receiver for use with the FIG. 3 embodiment.

FIGS. 3 to 5 show schematically the concept provided therefor. The digital stereo sound signals L/R of the sound studios are coded for data reduction according to the MUSICAM method for instance at 96 kbit/s for each single signal (MUSICAM=Masking Universal Subband integrated Coding and Multiplexing, described in "MUSICAM, an Universal Subband Coding System Description" by CCETT, IRT, Matsushita and Philips). Six of these data-reduced audio signals M1 to M6 are integrated in a DAB-multiplexer 1 to a data stream MUX=1.2 Mbit/s (including run-in and zero symbols as well as organization/data channel of sixteen kbit/s each). Then, the DAB-channel encoding is effected with a convolutional code ½ so that a data stream CH=2.4 Mbit/s is available at the output of the channel encoder 2. In a subsequent COFDM-modulator 3 an I-signal and Q-signal are produced digitally by inverse Fourier transformation, the signal representing for instance the 1536 carriers with respective 4 PSK-modulation of the COFDM packet. By D/A-conversion of the I-signal and Q-signal and a subsequent I/Q-modulator a 1.5 MHz COFDM signal C is obtained. With a total of four such DAB modules 1, 2, 3, 4 four COFDM signal packets C1 to C4 of a width of 1.5 MHz each are produced from a total of twenty-four data-reduced audio signals M1 to M24, which packets are placed in a 7 MHz channel pattern (convertor 4) and fed in integrated form as channel signal Cs to the frequency modulator 5 of the 30/20 GHz satellite link. The frequency-modulated intermediate carrier with corresponding preemphasis is fed via a frequency converter 6 to the 30 GHz uplink of the satellite link.

In this way it is possible in an analog transmission method to supply four COFDM packets with a total of twenty-four different programs to the discrete transmitters of a synchronized transmitter network in a country. According to FIG. 4 every DAB broadcasting station has a 20 GHz receiving means in which the incoming satellite signal is converted to an intermediate frequency followed by FM-demodulation and de-emphasis. After phase equalization and conversion of the baseband signals to the transmission frequency, for instance to channel 12 in the television band III or channel 3 (France) or channel 4 (Bundespost Telekom Berlin) of the television band I, power amplification is performed in the transmission amplifier (performance class 10 W to 1 kW) and after passage through a possibly necessary channel filter broadcasting occurs via the transmission antenna. The signals which are thus transmitted in bit synchronism via a plurality of DAB transmitting stations may be received by commercially available DAB receivers.

FIG. 5 shows a conventional DAB receiver for again receiving channel 12, for instance, in the synchronized transmitter network. The COFDM packets transmitted thereto are selected so that the correspondingly data-reduced audio signals M are available at the output of the COFDM decoder. The left/right speakers of the receiver are selected through a MUSICAM decoder and a corresponding LF-amplifier.

This transmission technique offered by Telekom can operate with a minimum number of baseband and channel coding means, and via frequency modulation. Also a conventional satellite transmission technique is used as well as an already existing 30/20 GHz transponder to the satellite Kopernikus. Moreover, the DAB transmitting stations permit the use of equipment components which are already in existence or may be derived from existing ones by adaptation.

In FIG. 4, in contrast with the known DAB system according to which only that one of the four received COFDM signal packets is filtered through a bandpass following the FM demodulator which is to be broadcast via the transmitting station, all four COFDM signal packets are simultaneously broadcast via the transmitter S. To this end it is merely necessary not to use the filter FI. In the receiver, four COFDM signal packets are correspondingly analyzed and reconverted to audio and video signals, respectively.

Figure 6:
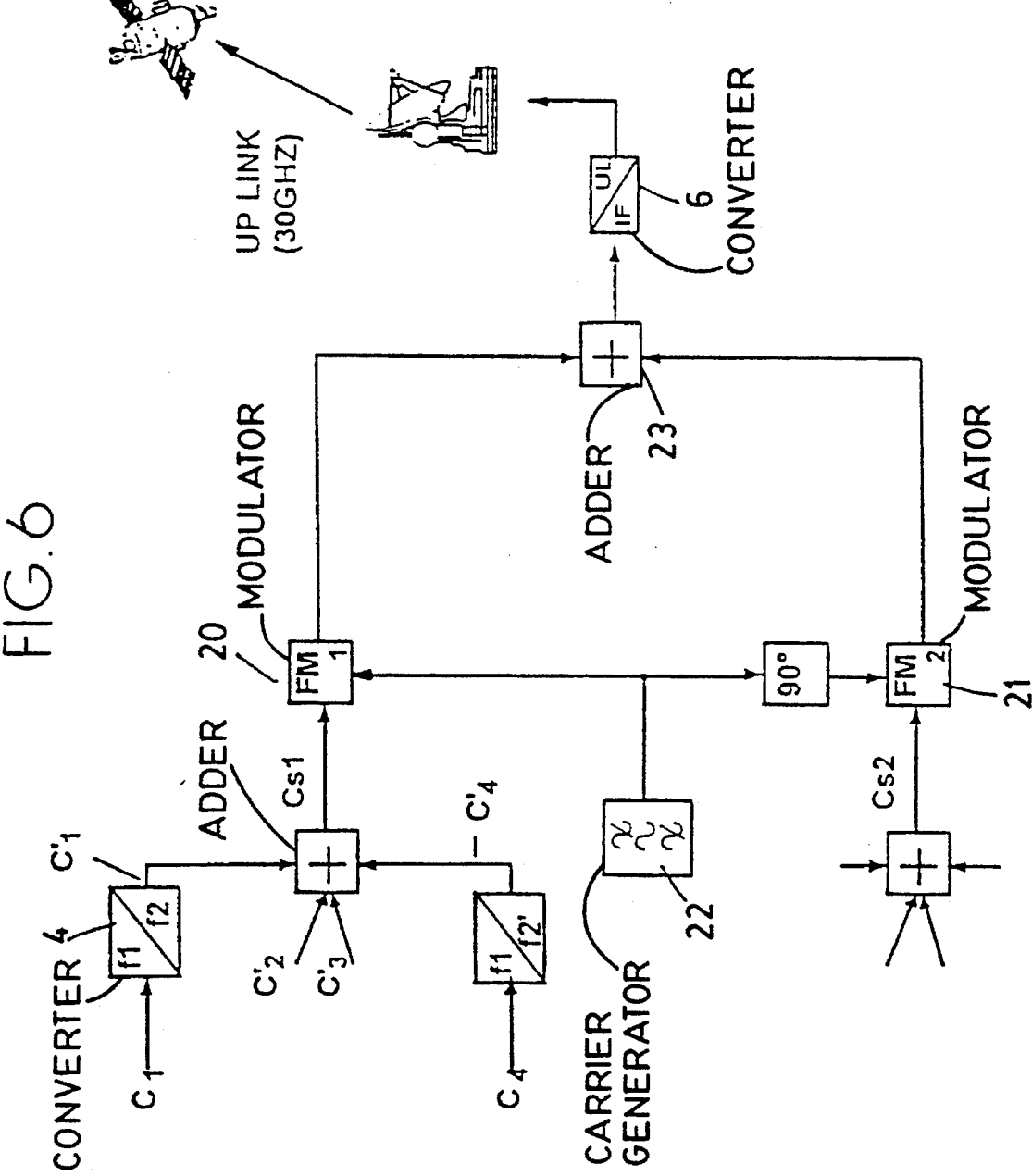
FIG. 6 depicts a satellite broadcasting station using FM modulation.
Figure 7:
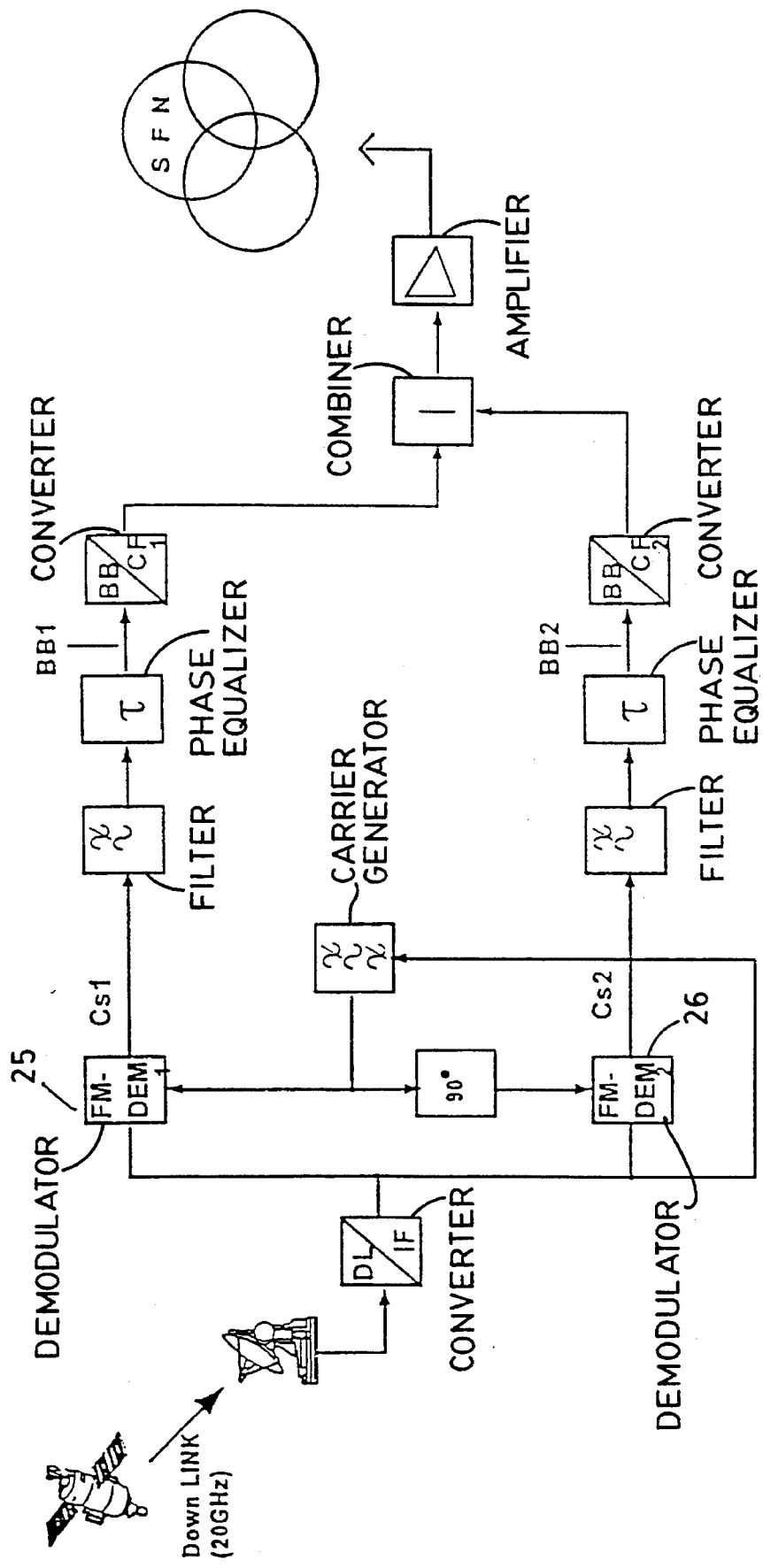
FIG. 7 depicts a satellite receiver for use with the figure transmitter.

FIGS. 6 and 7 show another possibility for doubling the transmission capacity of the satellite link by making use of a novel FM-modulator.

Quadrature amplitude modulators, as they are called, are known for amplitude modulation (Mäusl, Analoge Modulations-verfahren, Hüthig-Verlag, p.55). This principle may also be applied to frequency or phase modulation, as shown in FIG. 6. To this end two modulators 20 and 21 are used which are fed from a carrier generator 22 with phase quadrature. The modulator 20 is fed with the one channel signal Cs1 having four composite COFDM packets, and the other modulator 21 is fed with the similarly produced channel signal Cs2 having four COFDM signal packets processed by the same DAB modules 1, 2, 3, 4 as described in conjunction with FIG. 3. The output signals from the two frequency modulators 20 and 21 are combined in an adder 23 and directly supplied to the IF input of the frequency converter 6 of the satellite link. Via the satellite link through which a total of 4×6=24 programs can be transmitted in accordance with the proposal of FIG. 3, it is thus possible to transmit twice the number of programs.

Since the frequency modulation may also be expressed as phase modulation, the same process will be possible with a quadrature phase modulator, and in that case the modulators 20 and 21 will be corresponding phase modulators.

FIG. 7 shows the related DAB receiver in one of the DAB transmitting stations. Here, too, a corresponding quadrature phase demodulator is provided, consisting respectively of two demodulators 25 and 26 which are supplied with the IF signal from the satellite receiver and which are again fed from a carrier oscillator 27 in phase quadrature. As with the quadrature amplitude demodulator, the two original channel signals Cs1, and Cs2 are recovered with two separate FM demodulators so that, for example, either two separate DAB transmitters may each be serviced with 24 programs or the signals for one DAB transmitter may be chosen from a doubled number of programs. The two baseband signals BB1 and BB2 are combined in the carrier frequency, and the synchronized network or a single-transmitter system is fed via the corresponding broadband transmitter.

A further possibility of increasing the transmission capacity resides in the use of a DSR satellite broadcasting link for transmitting the processed digital signals to the individual DAB transmitters of the synchronized transmitter network.

Figure 8:
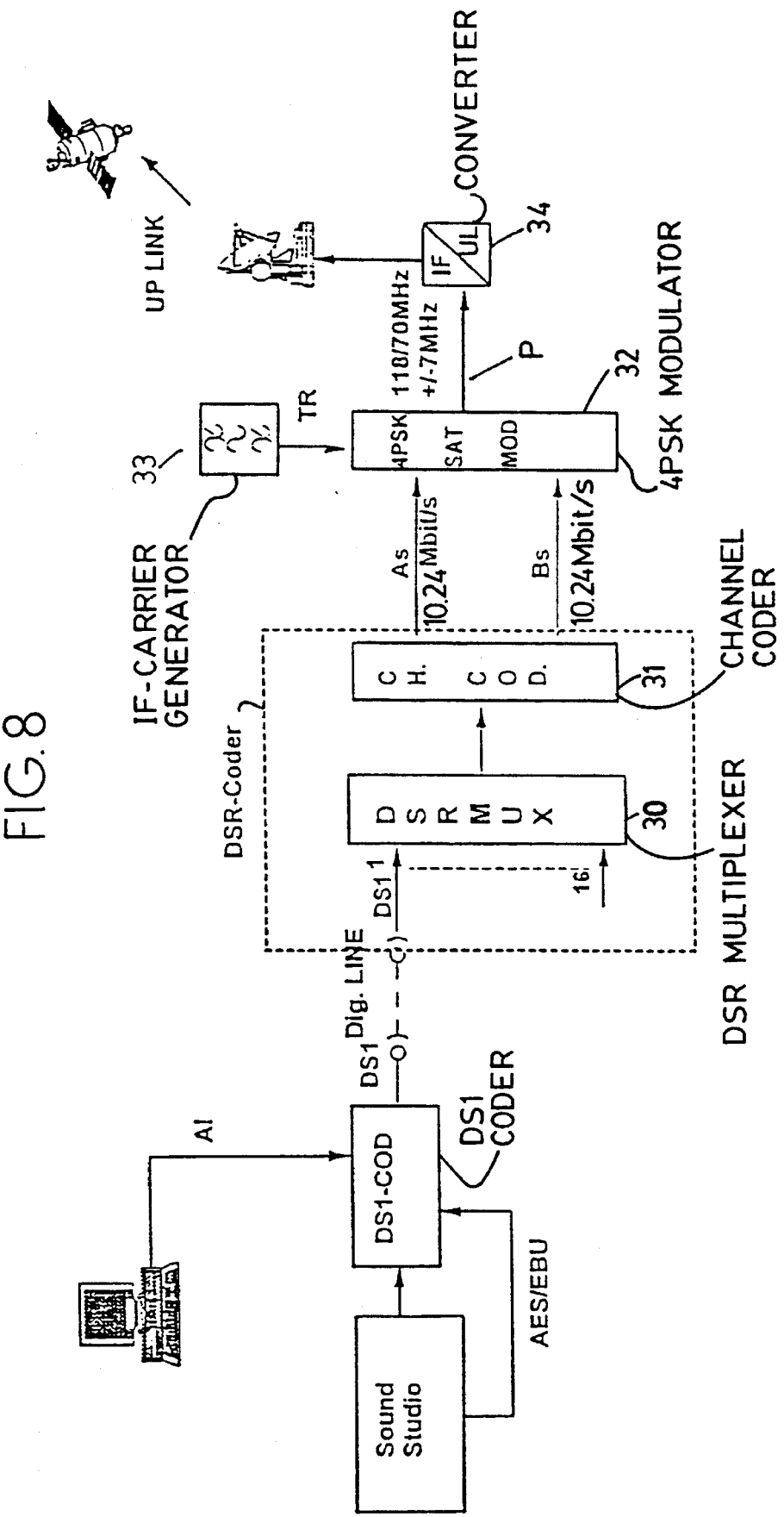
FIG. 8 depicts an embodiment of the present invention using a DSR satellite broadcasting link for transmitting the processed digital signals to the individual DAB transmitters.
Figure 9:
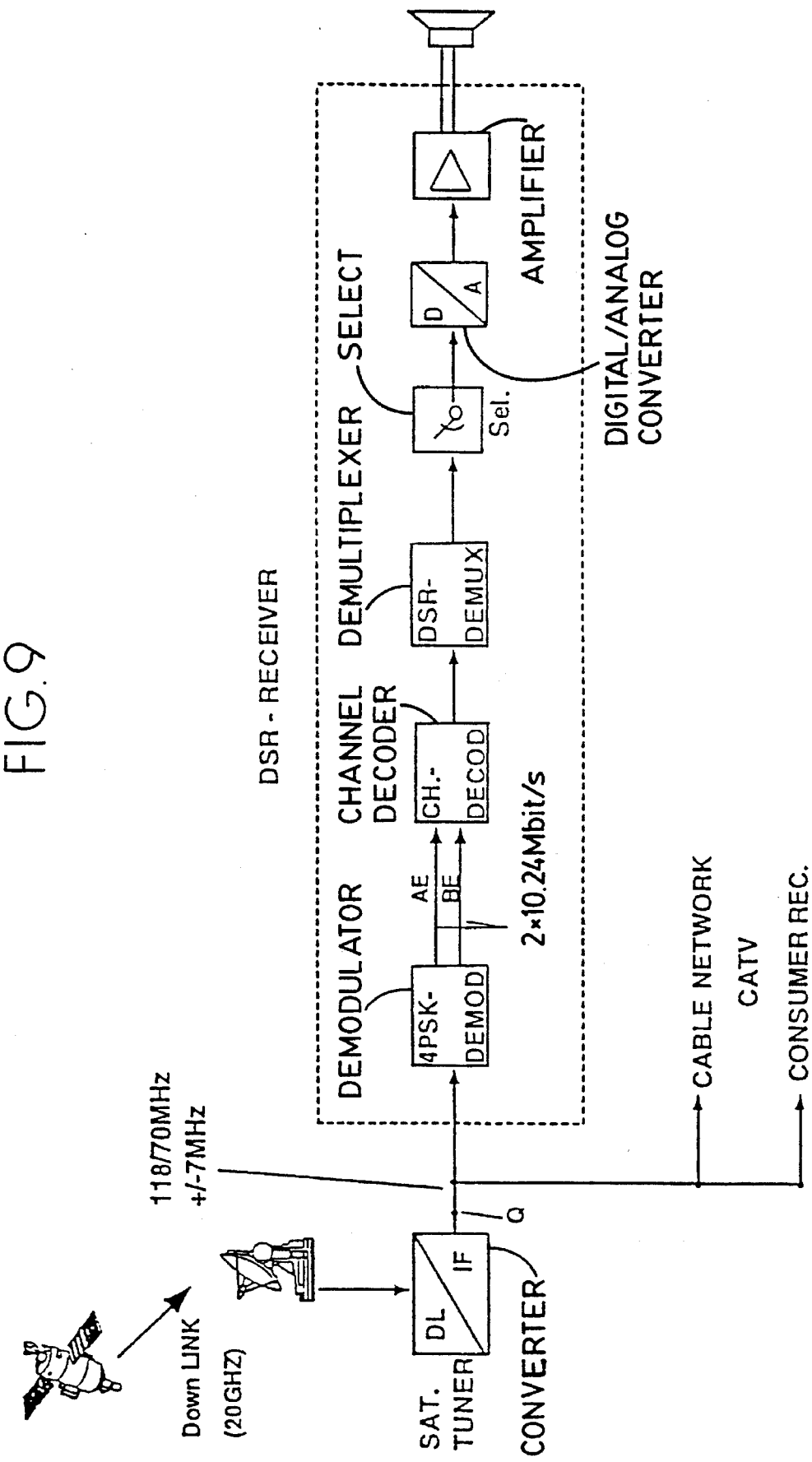
FIG. 9 depicts associated receiver equipment for reception with the consumer receiver distribution via broadband channel and reception with a professional DSR receiver for use with the figure embodiment.

FIG. 8 illustrates the basic layout of such a DSR system on the transmitter side. FIG. 9 shows the associated receiver equipment for reception with consumer receiver distribution via broadband channel and reception with professional DSR receiver.

In the DSR technique, (Digital Satellite Radio; described in "Neues von Rohde & Schwarz", No. 114, p. 14, and in the data sheet of the DSR modulator SFP of Rohde & Schwarz) sixteen digital DS audio signals generated in accordance with the DS1-method (Digital Sound 1 Mbit/2; described in "Neues von Rohde & Schwarz", No.114, p. 14) are supplied on lines to a DSR data multiplexer 30 and multiplexed therein (FIG. 8). From the total of sixteen DS1-signals two 10.24 Mbit/s data streams As and Bs are produced in a channel coder 31 together with frame synchronizing values and supplied to a 4 PSK-modulator 32 in which the IF-carrier 33 of 118 or 70 MHz is 4 PSK-modulated. The 4 PSK-modulated IF-carrier is then transformed in a frequency converter 34 to the transmission frequency of 18 GHz, for example, for the satellite link.

As shown in FIG. 9, at the receiver side the downlink satellite signal of 12 GHz, for example, is transformed to an intermediate frequency of 1 GHz and then transformed to 118 MHz. It is then further processed through commercially available DSR receiver apparatus which are now available as consumer devices.

Such a DSR satellite link according to FIGS. 8 and 9, which has already been installed and can be operated with simple equipment may be used for transmitting the programs to the individual broadcasting stations of a DAB broadcasting station network. There are various possibilities in this respect.

Figure 10:
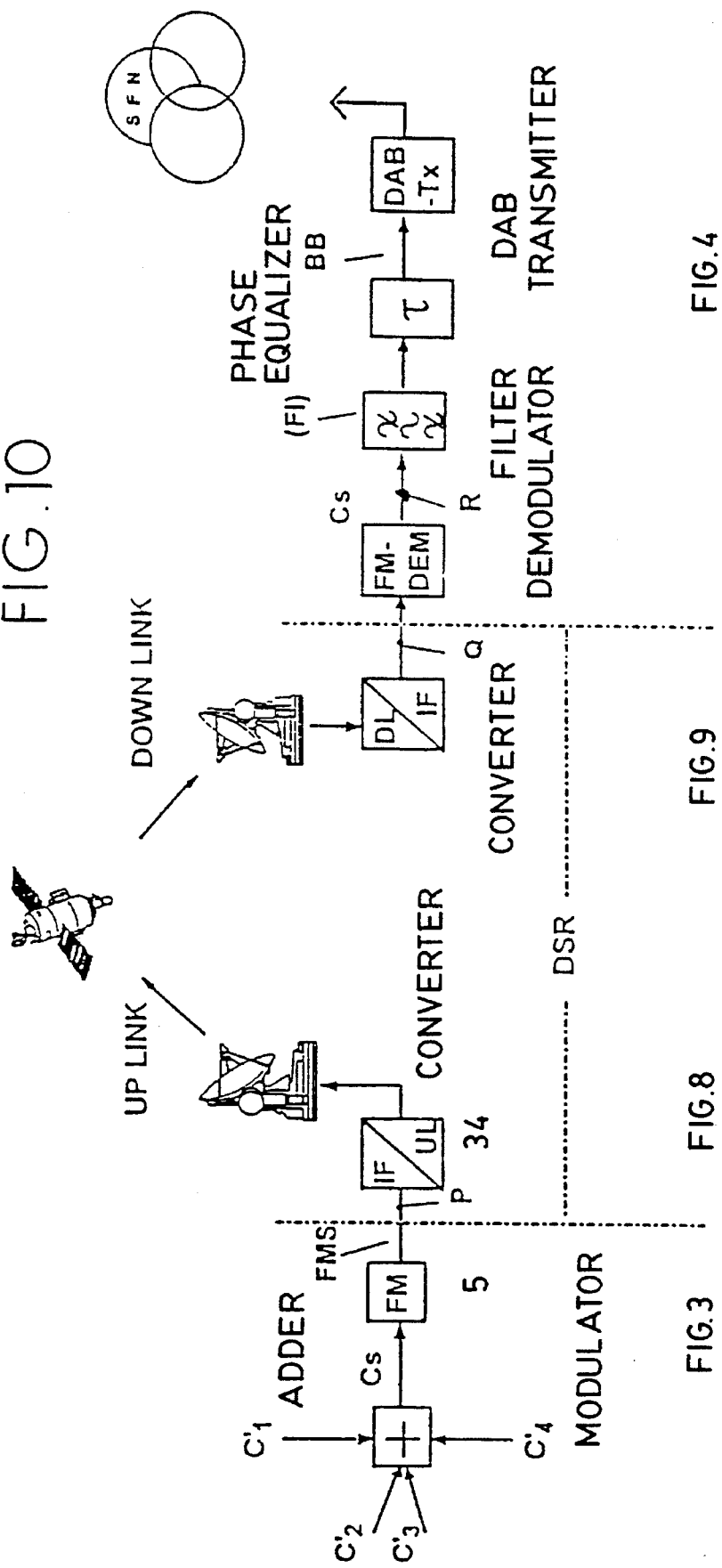
FIG. 10 depicts an embodiment of the present invention using a combination of systems depicted in FIGS. 3, 4, 8 and 9.

The first possibility shown in FIG. 10 is that the COFDM signals $C_1'$ to $C_4'$ of the DAB system of FIG. 3, each of which are 1.5 MHz wide, after frequency modulation in the modulator 5 are fed as FM-signal FMS direct to the 118±7 MHz input P of the frequency converter 34. In this way, four COFDM packets can be simultaneously transmitted on the transponder frequency band which has a total bandwidth of 27 MHz. At the receiver side these four COFDM signal packets will then be available at the output of the 118 MHz converter at point Q for FM-demodulation. The signal Cs at R is further processed as shown in FIG. 4 either with or without COFDM selector filter depending on the respective application.

Figure 11:
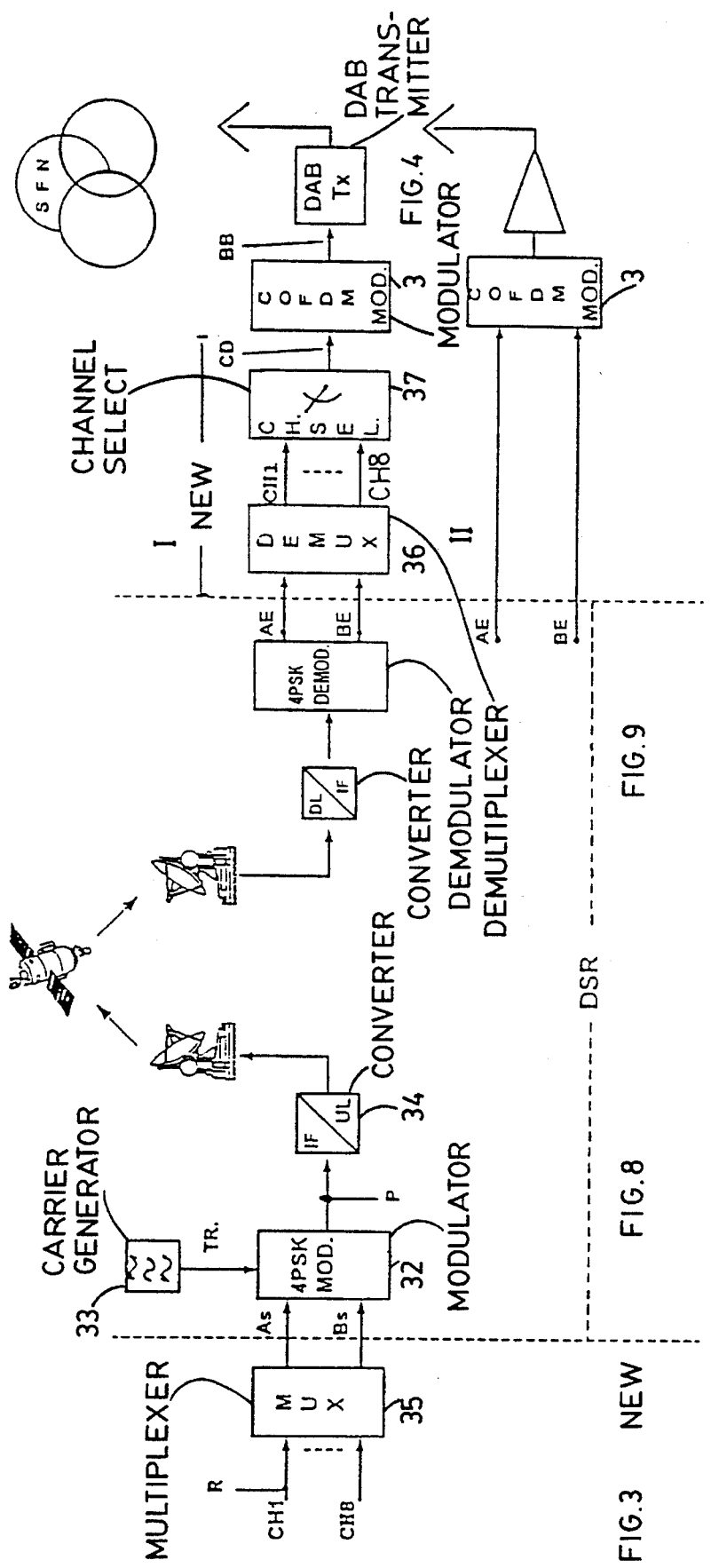
FIG. 11 depicts an embodiment of the present invention utilizing a combination of the systems depicted in FIGS. 3, 8 and 9 in addition to further processing means.

Another possibility is to utilize the 2×10.24 Mbit/s interface As or Bs of the DSR modulator for feeding the signals as shown in FIG. 11.

One possibility of doing this is, for example, to branch off at the interface CH subsequent to DAB channel coding with 2.4 Mbit/s for each COFDM packet (FIG. 3, point R) and to feed a total of eight such COFDM packets via a computer-controlled multiplexer 35 to the interface As/Bs of the DSR-modulator. In this way it is possible to transmit 8×2.4= 19.2 Mbit/s on the available 20.48 Mbit/s data channel. Subsequent to 4 PSK-demodulation, at the professional receiver (satellite receiver DSRU or DSRE of Rohde & Schwarz or a correspondingly suitable consumer receiver of the companies Grundig, Philips, Telefunken, Sony or Technisat) the signals AE, BE are again transparent and available. The remaining data capacity of 1.28 Mbit/s may be used for a matched data frame and optionally for additional data. This method satisfies to a high degree the requirement for bitsynchonous radiation of the transmitter of the DAB synchronized network, because the interface channel data rate (2.4 Mbit/s) at the DAB station is merely followed by the COFDM-modulator (as in FIG. 3), the frequency converter and the linear amplifier, as will be apparent from FIG. 4. In this example a data capacity of 8×2.4 Mbit/s=19.2 Mbit/s is made available at the interface AE, BE. Via the modules DEMUX (36) and CH SEL (37) a conventional DAB transmitter having a COFDM coder/modulator and amplifier can be fed (solution I according to FIG. 11). It is also possible, however, to directly select a correspondingly configured COFDM modulator 3' of higher data capacity and corresponding broadband amplifier (solution II). Conceptually, the COFDM-modulator 3' may be realized by the parallel connection of 8 COFDM modulators according to solution I. For practical use, a technically integrated solution is used.

Figure 12:
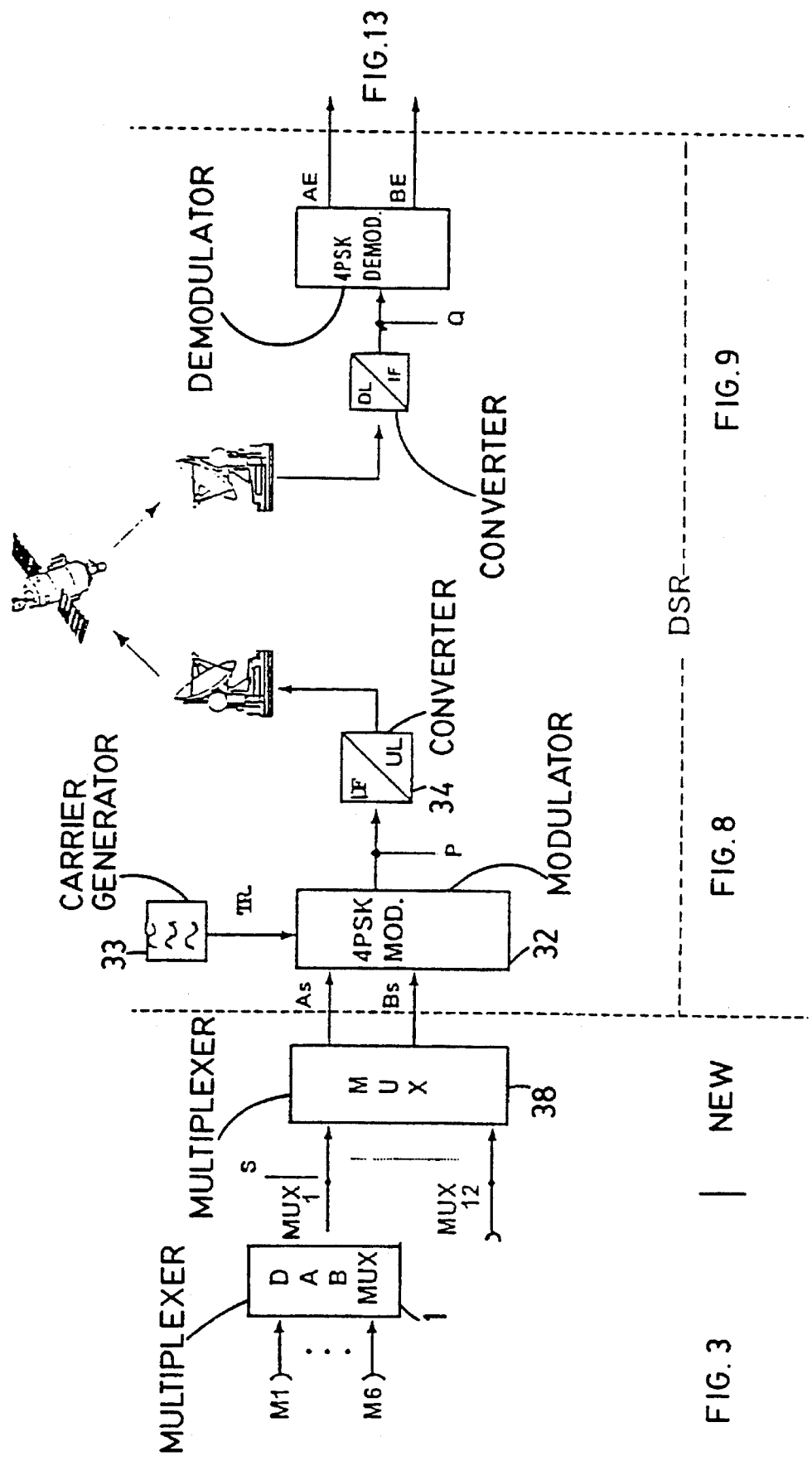
FIG. 12 depicts another embodiment of the present invention utilizing systems depicted in of FIGS. 3, 8 and 9.

Another possibility according to FIG. 12 is to branch off direct at the interface 1.2 Mbit/s from the output of the DAB multiplexer 1 at point S according to FIG. 3 and again to feed a plurality of MUX-signals (for instance up to 12) via a computer-controlled multiplexer 38 direct to the interface As/Bs of the DSR-modulator of FIG. 8. In the DSR-technique about 5 Mbit/s are utilized for check bits, synchronizing pulses and for the frame synchronization so that a net bit rate of 15 Mbit/s is available out of the total of 20.48 Mbit/s. This permits the transmission of, for example, twelve 1.2 Mbit/s MUX-signals via the DSR link.

Here, too, bit-synchronous transmission is required because at the receiver side of the DAB transmitting station there exists a fixed algorithm for the bit allocation to each carrier.

Figure 13:
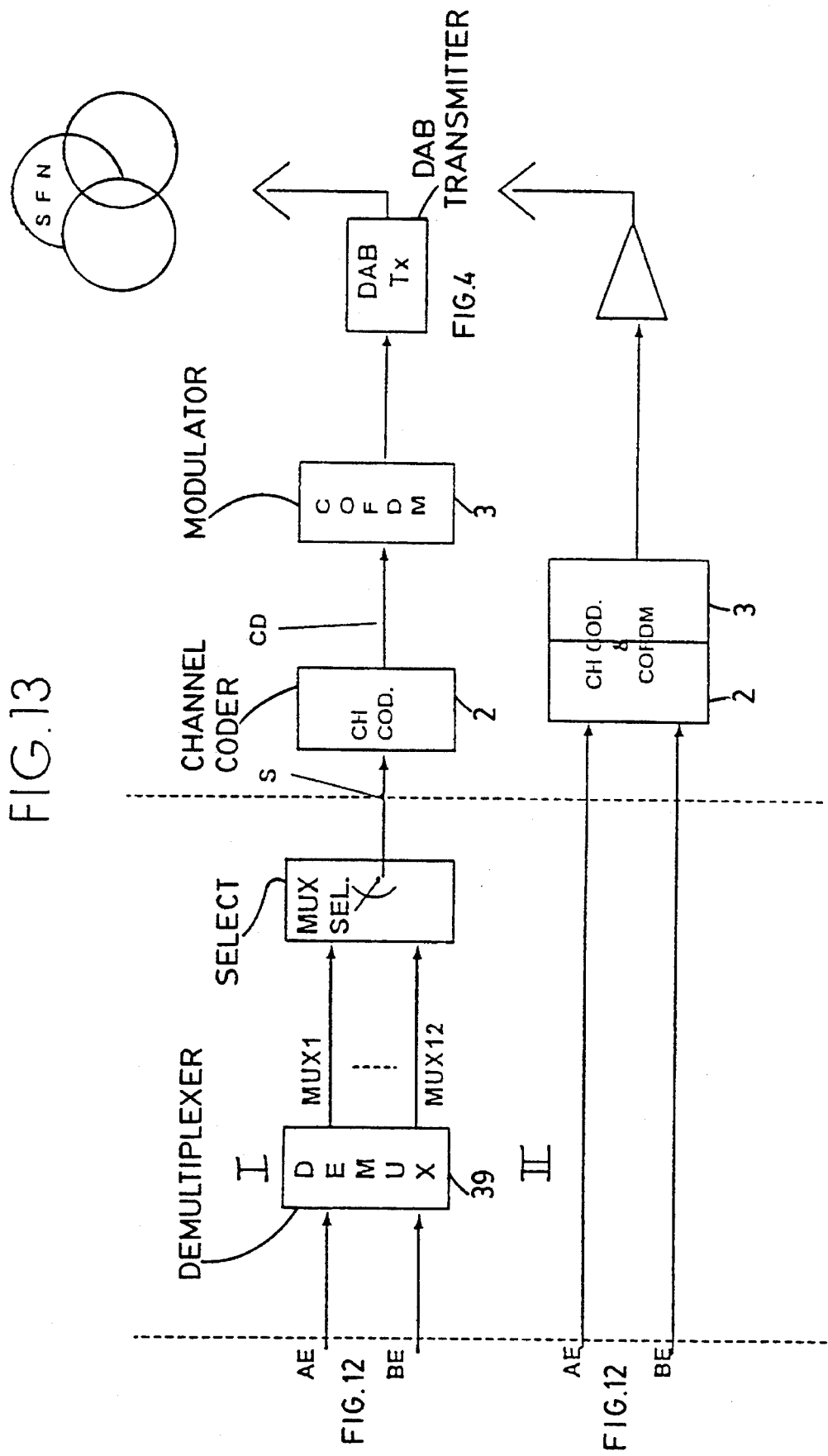
FIG. 13 depicts the receiver side of the satellite link for the FIG. 12 embodiment.

FIG. 13 shows the receiver side of the satellite link and the processing of the COFDM signal packets for feeding a conventional DAB transmitter in the conventional DAB technique (I according to FIG. 11) and, in modification II, a transmitter for digital broadcasting (audio and/or TV) with a channel coding and COFDM modulation for 12×1.2 Mbit/s to 2×10.24 Mbit/s, for example.

Figure 14:
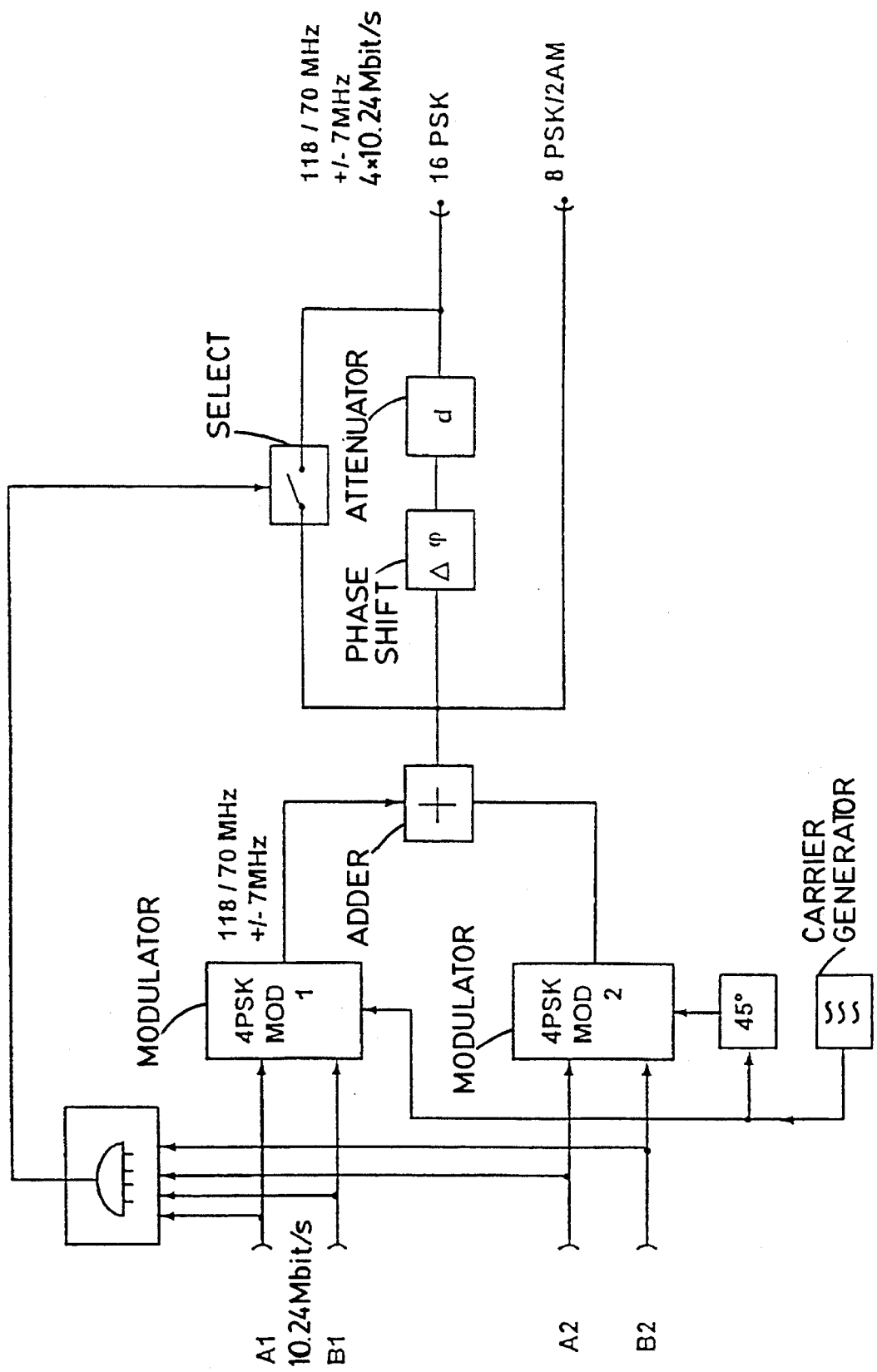
FIG. 14 depicts the basic diagram for DSR with 16PSK.

Another way of doubling the data rate for supplying programs to the digital broadcasting stations of the terrestrial synchronized transmitting network or to single transmitters based on DSR is the increase in PSK modulation, for instance to 8 PSK or 16 PSK modulation instead of 4 PSK modulation (DSR standard). This can be done because the BER (Bit Error Rate) with 4 PSK-DSR is already quite high (typically $1\times10^{-5}$ system redundancy) and because in the presently described case professional receiving equipment is used which may be adapted to the modulation method (e.g. reflector diameter, outdoor unit). Since the decision range of the phase demodulator at increased PSK is correspondingly reduced, the lower modulation gain may be compensated in this way. Given a corresponding bandwidth there remains the higher transmission capacity for each PSK step. FIG. 14 is the basic diagram for DSR with 16 PSK. Two DSR-4PSK modulators are used with vector coordinates shifted by 45° and summing of the output signals. At the output of the adder circuit there is a signal with 8 phase positions and two amplitude stages (corresponding to the amplitude ratio of the two diagonals in an equilateral parallelogram with the angles of 45° and 135°). This signal may be transmitted as 8 PSK/2 AM signal. The signal may also be converted to a 16 PSK signal by means of a switched 22.5° phase shifter and attenuator with a calculated attenuation of 7.66 dB (20 log (tan 22.5°)). This circuit with phase shifter and attenuator is bridged with the corresponding bit patterns of the input signals A1, B1 and A2, B2. The switching signal from the corresponding bit patterns is produced in a simple logic circuit providing a control signal for 8 of the 16 possible 4-bit conditions of the input signal.

The configuration with two coder/modulator (and demodulator/ decoder) devices may easily be used for lab and field trials. For professional operation a solution which is optimized as to circuit complexity would be appropriate.

FIG. 15 shows the DSR variants for the examples 4 PSK and 16 PSK (or 8 PSK/2 AM) (corresponding to 8 PSK or higher PSK) with the derived bit rates and the required bandwidths or TV channels, respectively.

The increase in transmission capacity for programs according to the present invention may also be used for other purposes. The increased transmission capacity need not only be used for transmitting an increased number of broadcasting programs. Instead of transmitting programs for the DAB synchronized transmitter network it is possible to utilize some of the transmission capacity for transmitting regional or local programs to the individual chosen broadcasting stations also via the satellite link.

In conventional FM technique a broadcasting station may be switched from transregional broadcasting to local broadcasting. Of course, this is not possible in a synchronized network. If broadcasting of the country-wide program is continued on a COFDM channel merely with an additional switching information e.g. in the form of a discrete carrier oscillation at the edge of the COFDM packet to inform the receiver that regional broadcasting is now also taking place on another COFDM packet, the receiver may on account of the additional information change either automatically or by user's choice to the local broadcasts. The DAB transmitter then transmits in a COFDM packet the country-wide signal of a given power and simultaneously transmits the regional program on another COFDM channel at correspondingly reduced power.

Due to the possibility of transmitting e.g. eight COFDM packets to a DAB transmitting station via satellite (either at the analog COFDM level or at the level preceding or succeeding the DAB channel coding) by means of the highly economic method with DSR there are eight COFDM packets at a DAB transmitting station from which four channels may be sorted out, e.g. for a system having a television channel and a DAB system having four synchronized networks. It is also possible, however, to transmit these eight COFDM packets in parallel, as it were, to two TV channels such as TV channels 11 and 12 either directly in parallel or separately. Based on the data capacity subsequent to DAB channel coding, i.e. 2.4 Mbit/s per each packet, this system provides for a transmission system of 19.2 Mbit/s including channel coding. These 19.2 Mbit/s occupy two TV channels, and now a DAB system is conceivable in which twelve programs instead of six may be transmitted countrywide, but a system for transmitting digital TV signals is also conceivable.

The above examples explain how the data capacity may be utilized in optimum fashion via satellite on a DSR basis for the conventional DAB system, and how a digital broadcasting system having a data capacity of up to 8×2.4 Mbit/s 19.2 Mbit/s, for example, may be designed by conceptual parallel connection of 8 COFDM coders and modulators through a wide-band amplifier in two TV channels, as specified in the example. Below, a modulation method will be explained by which a dual data capacity for each COFDM signal packet is achieved so that, for example, 19.2 Mbit/s can be transmitted on one TV channel of a bandwidth of 7 or 8 MHz either in a synchronized network or a single transmitter for mobile reception. As specified, this holds for mobile reception so that portable or stationary reception will be possible simultaneously.

The respective basic diagram is illustrated in FIG. 16A. Two DAB-COFDM coders/modulators Mod1 and Mod2 are used with vector diagram coordinates offset by 45° and simple summing of the output signals.

There results 8 PSK for each COFDM carrier with two amplitude stages A1 and A2 corresponding to the ratio of amplitudes of the two diagonals in an equilateral parallelogram with the angles 45° and 135°. This signal may be transmitted as 8 PSK/2 AM signal. It is produced by means of the circuit configuration having dual IFFT, D/A-conversion and I/Q-modulation (QAM).

FIG. 16B illustrates the respective vector diagrams for the two 4 PSK modulators Mod1 and Mod2 having their phase positions respectively offset by 45°. Also, the vector diagram of the 8 PSK/2 AM modulation is illustrated in FIG. 16C which results from the geometrical summing of the two 4 PSK modulations in the adder stage, resulting in eight different phase positions with two respective amplitude stages A1 and A2, respectively. The two amplitude stages A1 and A2 correspond to the diagonals in an equilateral parallelogram with the apex angles of 45°. This 8 PSK/2 AM-modulation may be realized very easily because only two 4 PSK-modulators and an adder stage are required. The combination of PSK-modulation with AM-modulation moreover offers the advantage over a mere increased PSK that demodulation and decoding in the receiver will also be simpler. The receiver only requires a phase detector for eight phase positions and an additional amplitude demodulator for only two level stages. Hence, the substantial increase in the transmitted data quantity requires little effort on the receiver side and is superior to a mere increase in PSK.

For lab and field trials the technique with dual transmission and receiving devices can be used very simply, for professional operation an appropriate solution should be optimized as to circuit design.

DAB and DSR both have 4 PSK-modulation, a multiplicity of carriers (e.g. 1536) is used only with DAB while DSR uses only one carrier.

The influence of the increased PSK (e.g. 16 PSK) is explained in FIG. 14 for DSR. This also holds for DAB with 8 PSK/2 AM. The provided protective interval and orthogonality are preserved (FIG. 17). The criterion of two amplitude stages is added, or the decision range of the phase demodulator is decreased, respectively. This is counter-acted for instance by corresponding Forward Error Correction (FER) or channel coding, time and frequency interleaving and optionally computer-aided "intelligent" coding and decoding (explained below under Trellis coding and Viterbi decoding).

The modified DAB method with 4 COFDM packets and 8 PSK/2 AM modulation offers a capacity of 4×2×2.4 Mbit/s=19.2 Mbit/s. Taking into account the 0.2 MHz gaps when 4 COFDM packets are packed in a 7 MHz channel pattern, the system is directly comparable with the proposals for digital terrestrial HDTV television filed with ATTC (Advanced Television Test Center) in the United States of America (FIG. 18).

FIG. 19 specifies the possibilities for the use of 4 PSK or 8 PSK/2 AM. Especially the use of 8 PSK/2 AM and 2 TV channels offers a capacity of 38.4 Mbit/s. This is sufficient for the European HDTV proposals with a baseband coding of 34 Mbit/s.

The use of a higher data capacity provides for an important application in narrow-band systems of a bandwidth of e.g. 200 kHz which is used, for instance, in the U.S.A. for transmission of a stereo signal (inband solution).

The following will result when the DAB system with 4 PSK-modulation is used:

1536 carriers/2.4 Mbit/s 1.5625 kbit/s per carrier 1.5 MHz bandwidth/1536 carriers 0.977 kHz/carrier spacing With a bandwidth of 200 kHz there result 204 carriers and a data rate (4 PSK) of 318 kbit/s. Assuming 96 kbit/s for each single signal for MUSICAM, the resulting channel coding is $$\frac{192 \text{kbit/s}}{381 \text{kbit/s}}$$

which corresponds to 1:1.65.

This is sufficient for DAB—inband proposals from the U.S.A. (ACORN-DAB), but in view of DAB according to Eureka 147 with the channel coding of 1:2 and in view of the narrowband application (multipath reception, frequency interleaving) it is insufficient.

By the use of, for example, 8 PSK/2 AM or 16 QAM there results a channel coding of 1:3.31. Thereby the chance of realizing narrowband DAB (apart from the problem of multipath reception) is increased or, respectively, an increased capacity for multi-value services is conceivable.

In the field of video coding considerable advances are presently made particularly in the U.S.A. ISO-MPEG has standardized picture coding with 1.5 Mbit/s and picture coding with 10 Mbit/s in the VADIS project at D2-MAC quality, picture format 16:9.

HDTV-grade coding with 20 Mbit/s including channel coding can be achieved. This makes possible, for instance, a system of digital terrestrial moving-picture transmission for mobile, portable or stationary reception as well as CATV or SAT-systems, for instance at four quality levels. These are: Video telephone with 64 kbit/s; Watchman grade (e.g. 1.5 Mbit/s); PAL-Plus/D2-MAC grade, format 16:9 with 10 Mbit/s up to HDTV grade with a maximum of 19.2 Mbit/s (including channel coding); and HDTV grade with 34 Mbit/s baseband coding (total of 38.4 Mbit/s).

Of course, the TV sound transmission for example in up to six languages is also possible with the DAB technique or MUSICAM, respectively. A composite technique of DAB and Digital Video Broadcast, DVB, may be realized and results in a universal receiver.

Apart from time-dependent "data" such as language/music (DAB) and moving picture (DVB) it is also easily possible to realize applications of data technique with time-independent data such as still pictures or multi-value services. This results in a digital integrated broadcasting service (DIB, Digital Integrated Broadcasting).

There exist concepts for: blocking of cheque cards, anti-theft protection for automobiles, transmission of stock exchange news, video text, interactive videotex ("Bildschirmtext"), and transmission of telephone directories or dictionaries.

The services mentioned so far are related to broadcasting, i.e. point-to-multipoint transmission without addressing. Since the data capacity, which in the example is 19.2 Mbit/s, is extraordinarily high, applications with addressing such as pay-TV or applications for radio call, e.g. radio paging, are also conceivable.

The following shall be set out in respect of DAB with satellite direct reception or reception in cities and shielded valleys via so-called gap filters (reception and retransmission at the same frequency):

The developed considerations also apply to a DAB system with a 1.5 GHz or 2.6 GHz channel (possibly allotted by WARC'92) for satellite-broadcasting or terrestrial broadcasting (1.5 GHz). As for the present the frequencies at 1.5 GHz are not free and a suitable satellite is not available either for 1.5 GHz or for 2.5 GHz (costs amount to approx. half a billion DM) the introduction of such a system probably has no chance for the next ten years. Nevertheless, it should be noted that the developed considerations would also apply to a system with e.g. 8 COFDM packets and a gross data capacity of 19.2 Mbit/s for satellite DAB.

Of course, the system may be improved for COFDM packets in 7 MHz TV channels at a frequency spacing of 0.2 MHz by establishing the plurality of COFDM channels required for instance for a video transmission in continuous fashion, i.e. without 0.2 MHz gaps, whereby the gross data capacity would be correspondingly increased.

Figure 20:
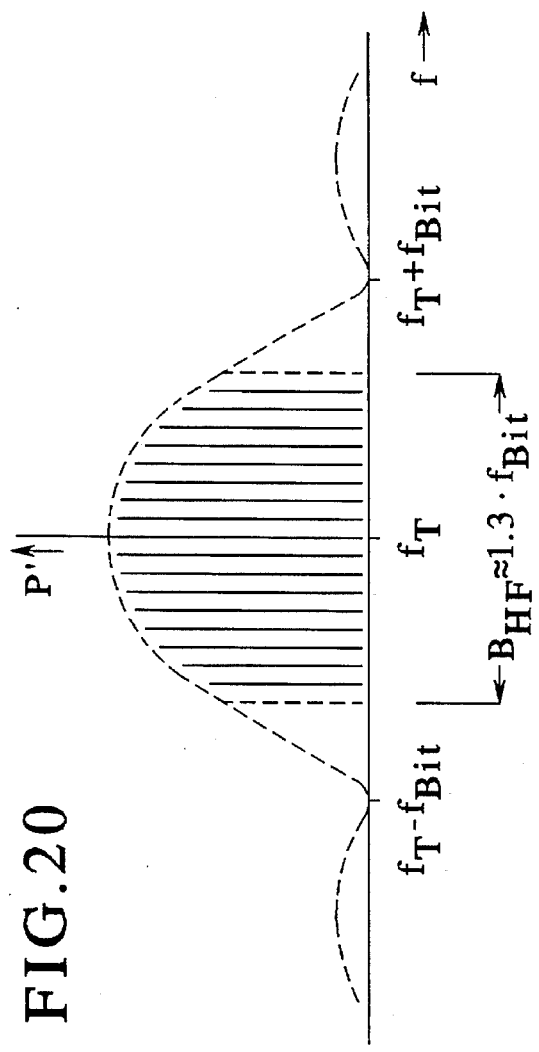
FIG. 20 is a diagram showing actual effective bandwidth of the DSR channel.
Figure 21B:
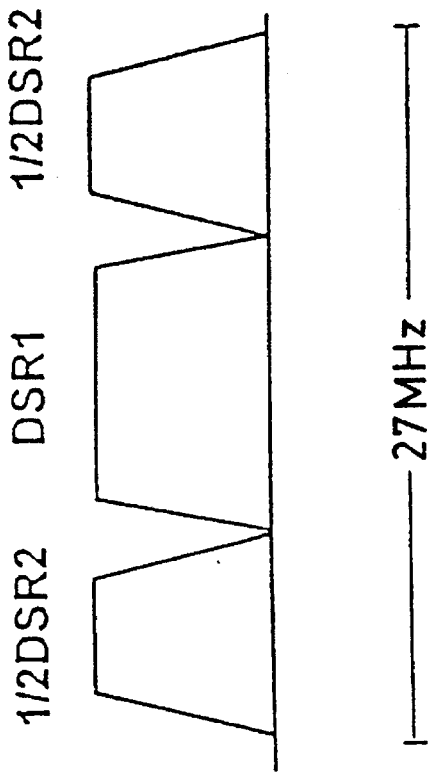
FIGS. 21a and 21b depict two different embodiments for DSR channels.
Figure 21A:
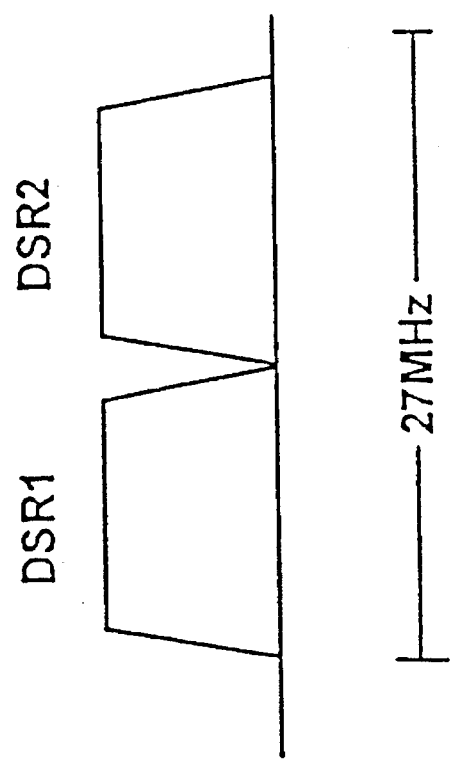

The described considerations are directed, among other things, to the utilization and adaptation of the introduced DSR technique which now experiences considerable consumer growth. The DSR signal is passed at 14 MHz bandwidth through one transponder. However, the actual effective bandwidth of the DSR channel is calculated (FIG. 20) and measured at approximately 13 MHz. Hence, two DSR channels can be transmitted on one transponder of 27 MHz bandwidth (or 36 MHz bandwidth, respectively) (FIG. 21a, 21b). The two DSR channels could be positioned side-by-side within the transponder bandwidth (FIG. 21a) or, in an optionally upward-compatible solution, in the upper and lower free region with a supplement of ½ DSR2 each (FIG. 21b). This would double the offering capacity to the digital broadcasting transmitters. In addition to the above-described applications, such a system would also be important for DSR, DSR/MUSICAM (the DSR-plus technique, as it is called) or DSR/DHDTV (transmission of digital HDTV via DSR channel).

The possibilities described with reference to the figures in respect of increasing the transmission capacity may also be commonly used in suitable combinations whereby a correspondingly increased transmission capacity is obtained.

For example, the solution using two DSR channels for each transponder may also be used for the solutions of the present invention as shown in FIGS. 10, 11 and 12.

The mentioned methods are based on DSR, i.e. basically on the satellite frequencies of 18/12 GHz used therein and 4 PSK-modulation at a bandwidth of 14 MHz for 20.48 Mbit/s. Hence, there result highly economic solutions because the entire professional transmission technique and also consumer receivers with the interface A/B, i.e. 2×10.24 Mbit/s, are available.

The mentioned methods may also be used, however, for other satellite frequencies (frequency transformation) as well as for other modulation methods which result in a different bandwidth and bit rate. This means that the available transponder bandwidth and the chosen modulation method result in a transmittable data rate which is then (as described in the appropriate sense for DSR) adapted to the DAB data rates at defined interfaces through computer-aided multiplexers.

From the aspect of the structure of the radio stations with their largely self-supporting networks between program sources and listeners, the program supply of the sources of all radio stations (radio stations under public law and/or private radio stations) to the common earth station as the place of transmission to the satellite sometimes constitutes a disadvantage. This holds in respect of costs for renting program lines (e.g. ISDN, DS1) and also on account of functional and operational reasons.

The SCPC method as it is called (Single Channel Per Carrier) represents an alternative in which a satellite transponder is selected by a plurality of earth stations.

Figure 22:
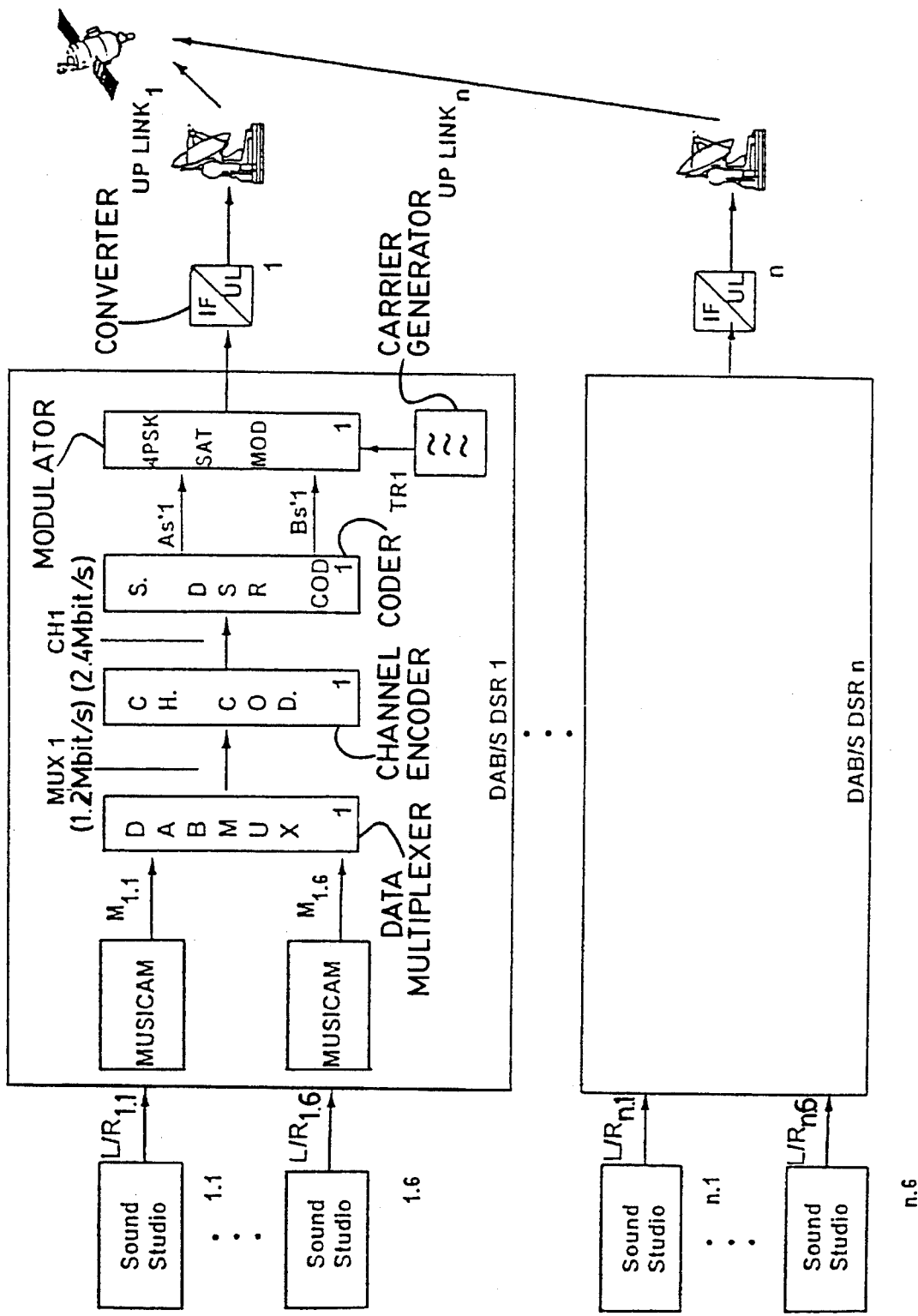
FIG. 22 depicts an embodiment of the present invention wherein a DAB signal is initially formed with MUSICAM, a DAB multiplexer and channel coder.
Figure 23:
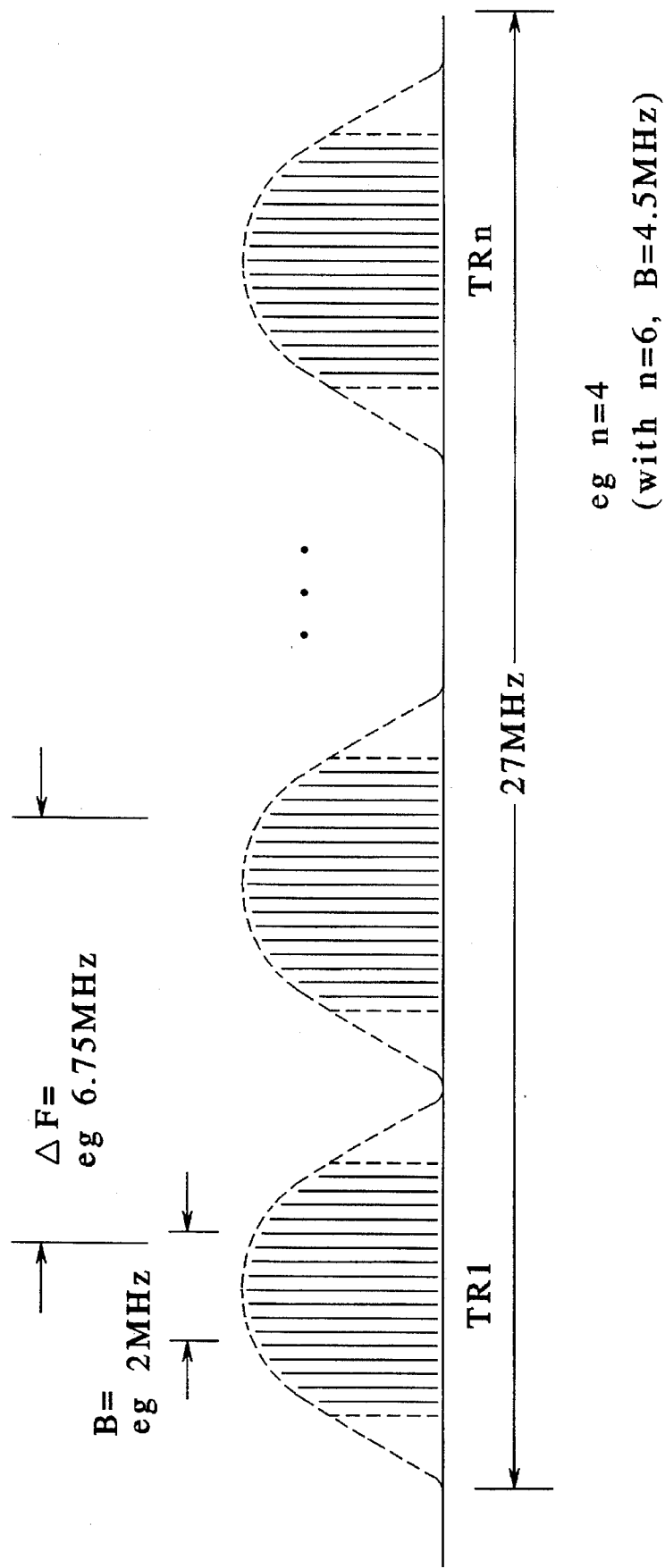
FIG. 23 is a diagram depicting the frequencies of the transponder in the FIG. 22 embodiment.

In that case the satellite signal is composed of the sum of input signals. In conjunction with the SCPC system it is possible to establish a system which shall be called narrow-band DSR (SDSR). In FIG. 22, a DAB signal is initially formed with MUSICAM, DAB multiplexer and channel coder. The signal CH of 2.4 Mbit/s is formed through an auxiliary frame in the SDSR block to the signals As'1 and Bs'1 of, for example, of 2×1.5 Mbit/s. This is followed by a DSR-4 PSK modulator and the UPLINK. The transmitted signal has a bandwidth based on FIG. 20 of 2 MHz as an example. The number n of such earth stations feed the satellite so that a structure illustrated in FIG. 23 will result on the transponder. According to FIG. 24, at the DAB transmitter station an SDSR block is filtered, 4 PSK-demodulated and supplied via the COFDM-modulator to the actual DAB transmitter (SPSK/2 AM or 16 QAM may also be used here instead of 4 PSK). In this way, with n=4 a total of 24 programs can be transmitted. With n=6 there result 36 programs. The interfaces A'/B' can be considered transparent so that the transmission may also take place based on other data levels (e.g. MUX) or another number of programs (other than 6, for example).

This technique will also readily satisfy the requirements for scrambling e.g. at the MUSICAM level or for access protection e.g. under the EUROCRYPT standard through the SDSR block.

The illustrated technique may also be combined with other services (e.g. television) provided corresponding gaps (e.g. 2 MHz) exist.

The DSR technique is highly frequency-economic because it transmits the gross data rate of 20.48 Mbit/s to a 14 MHz wide transmission channel (1.46 bit/s per Hz). DAB also operates with 4 PSK modulation to 1536 carriers (4×2.4 Mbit/s per 7 MHz=1.37 bit/s per Hz). Various publications and, on the other hand, advances made in chip integration indicate a more efficient modulation technique. In the Trellis-coded modulation (TCM) a higher PSK, e.g. 8, 16 or 32 PSK or higher QAM, e.g. 16, 32, 64 QAM, is used.

TCM is an integrated coding and modulating technique for digital transmission in band-limited channels. The principal advantage resides in that TCM offers a significant modulation gain with respect to conventional modulation methods at comparable bandwidths. While a special finite-state encoder is used in the transmitter, decoding in the receiver occurs through a soft decision maximum-likelihood sequence decoder. The sensitivity for additive noise with simple four-state TCM can be improved by 3 dB as compared to non-coded modulation. A more complex TCM achieves 6 dB at the same bandwidth and the same effective data rate (lit.: Trellis-Coded Modulation with Redundant Signal Sets, Ungerböck IEEE Communications Magazine February 1997-vol.25.No.2).

The technique of Trellis modulation and Viterbi decoding could also build on the DSR and DAB technique in conjunction with the presently considered digital terrestrial radio system insofar as the modulator portion is adapted and at the receiving part the Viterbi decoder is connected to a suitable point of the 4 PSK-demodulator. Trellis coding in conjunction with OFDM (Orthogonal Frequency Division Multiplexing) is of particular interest for digital terrestrial television. The additional effort of the Viterbi decoder relative to the receiver is more highly justified for TV than it is for radio.

FIGS. 25a, 25b to 28a, 28b show some examples for other possible highergrade modulation techniques with more than four phase positions which may be used instead of the 8 PSK/2 AM modulation technique described in FIG. 14 both for producing the COFDM packets and for transmission under the DSR principle via satellite while being configured from commercially available 4 PSK-modulators.

Figure 25A:
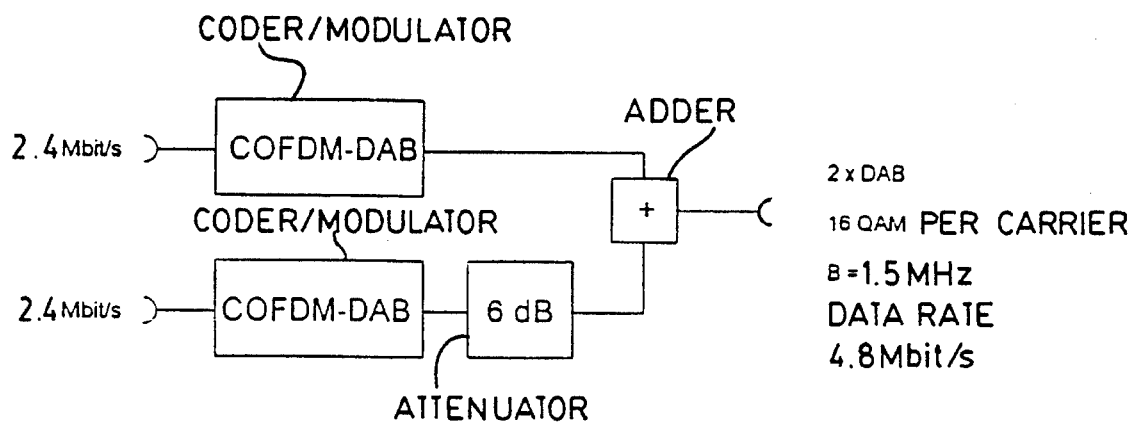
FIGS. 25a and 25b illustrate the 16 QAM-modulation principle as used for producing the COFDM signal packets under the DAB principle.
Figure 25B:
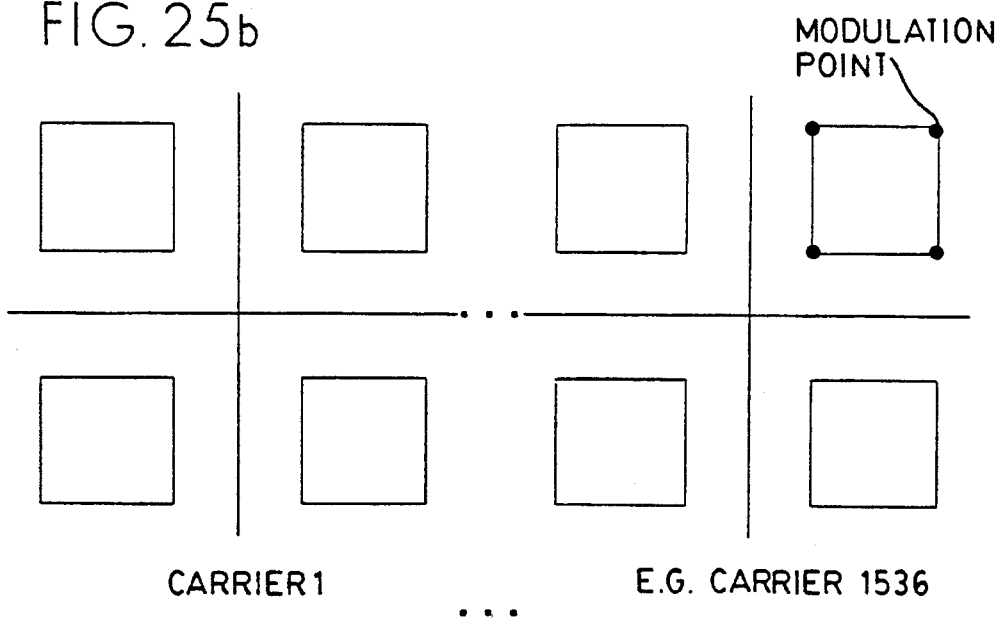

FIG. 25a, 25b show the 16 QAM-modulation principle (p. 236 of the book by Mäusl for single carriers) as used for producing the COFDM signal packets under the DAB principle. Here, two 4 PSK-COFDM coder/modulators are combined in an adder stage with a 6 dB-attenuator connected therebetween at the output of the one coder/modulator so that the two output signals are added with a ratio of amplitudes of 1:0.5. Thereby, the 1536 carriers under the DAB principle, for example, are each modulated with 12 different phase positions and three amplitude conditions as shown in the respective carrier model of FIG. 25b, so that it is possible to transmit an increased data quantity.

Figure 26A:
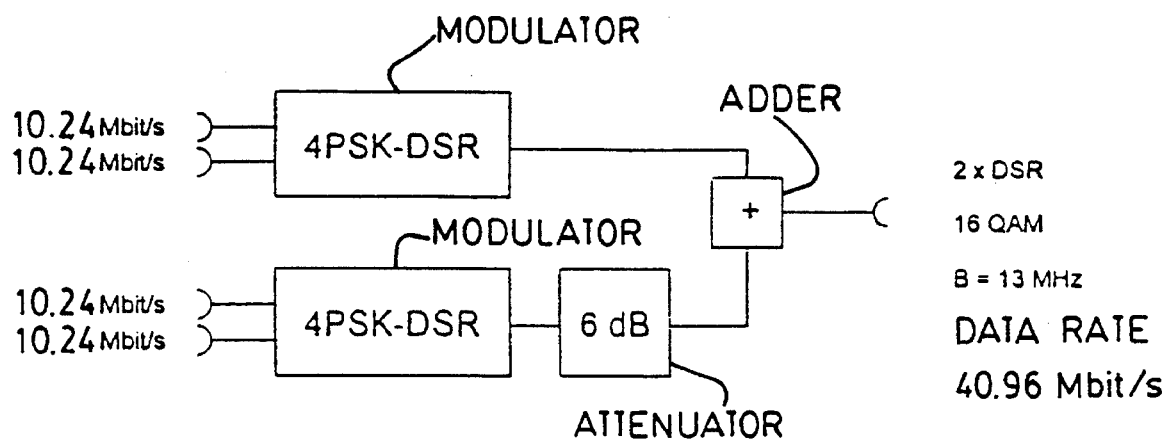
FIGS. 26a and 26b depict the 16 QAM modulation principle for doubling the data quantity on the DFR satellite link.
Figure 26B:
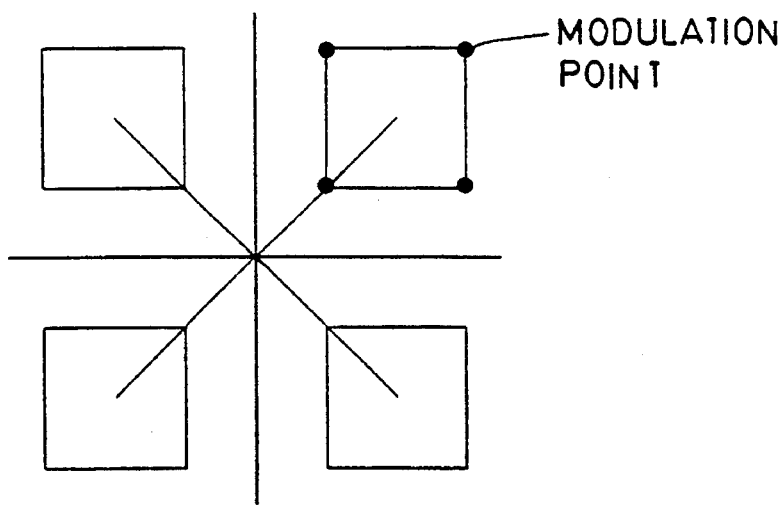

FIG. 26a, 26b shows the use of this 16 QAM modulation principle for doubling the data quantity on the DSR satellite link. Again two 4 PSK-DSR modulators are combined with their outputs at an amplitude ratio of 1:0.5 whereby the single carrier of the DSR link is modulated.

Figure 27A:
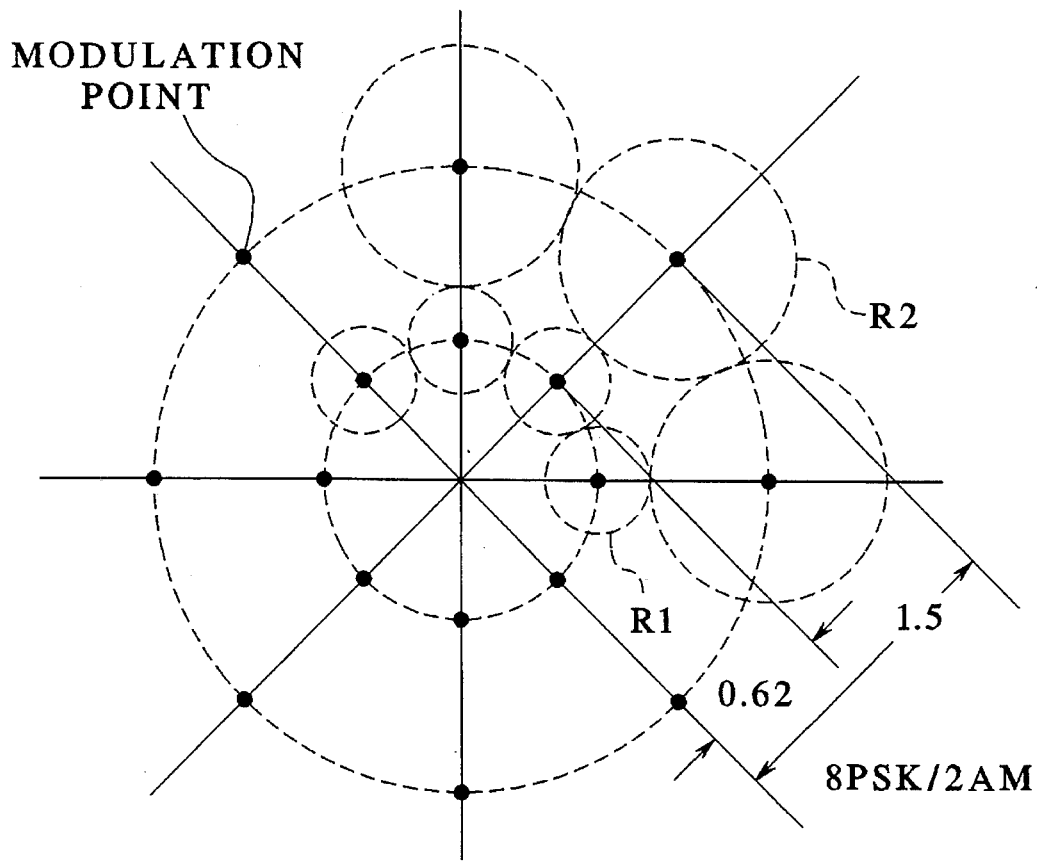
FIGS. 27a and 27b depict a comparison between the modulation type 8 PSK/2 AM (FIG. 14) and the 16 QAM modulation according to FIGS. 25a, 25b and FIGS. 26a, 26b.
Figure 27B:
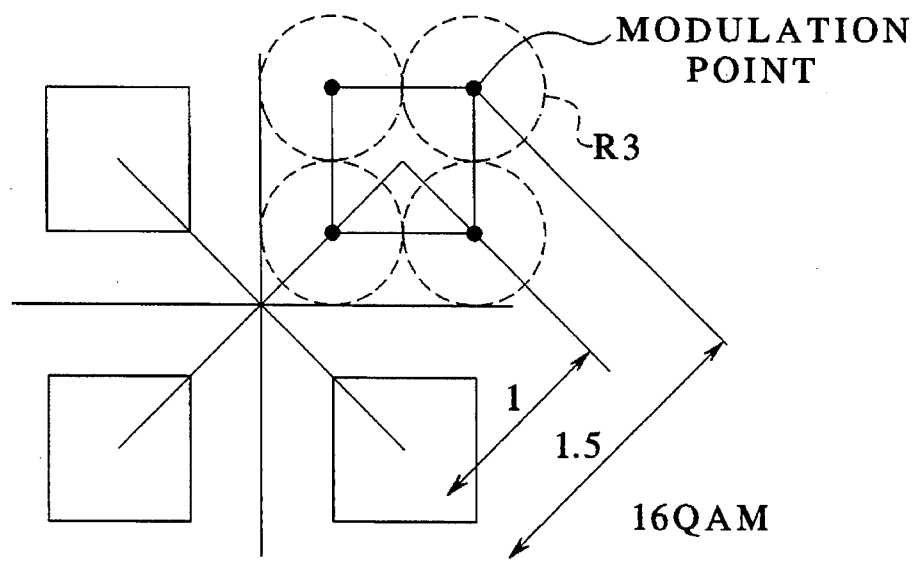

FIGS. 27a, 27b show the comparison between the modulation type 8 PSK/2 AM (FIG. 14) and the 16 QAM modulation according to FIGS. 25a, 25b, and 26a, 26b. This shows that the 16 QAM technique is more advantageous in respect of the C/N ratio while on the other hand the 8 PSK/2 AM technique exhibits advantages in non-linear transmission systems because there are only two amplitude stages as compared with three amplitude stages in the 16 QAM technique and only eight phase positions as compared to twelve phase positions in the 16 QAM technique.

FIGS. 27a, 27b show that in the 8 PSK/2 AM technique there exist decision thresholds of different magnitude, but this can be compensated by corresponding consideration in the preceding channel coding. The modulation points on the inner circle are provided with a higher error protection than those on the outer circle. In the final analysis, this achieves the same error protection bit rate as in the QAM technique with the exception that a very small amount must be used for organization because of the unequal error protection.

Figure 28A:
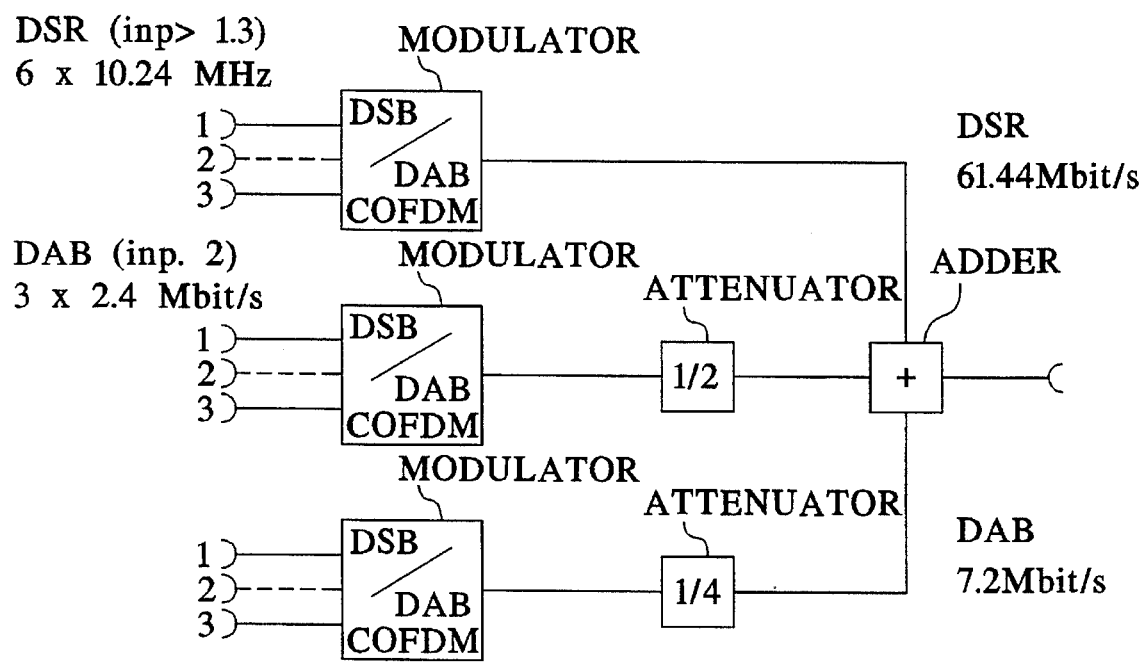
FIGS. 28a and 28b depict a 64 QAM modulator which is suitable for both DSR (single carrier) and DAB (multi-carrier).
Figure 28B:
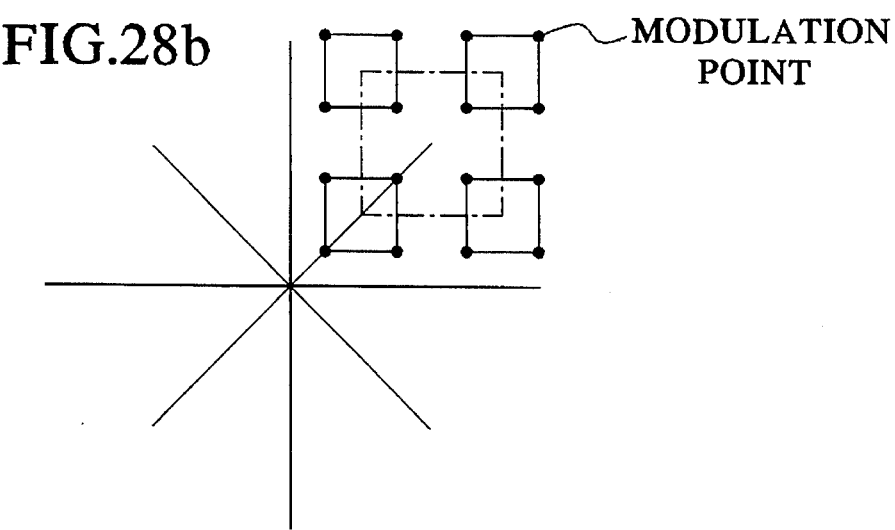

FIGS. 28a, 28b show the realization of a 64 QAM modulator which is again suitable for both DSR (single carrier) and DAB (multi-carrier). In this case three commercially available DSR-4 PSK modulators or, respectively, three commercially available DAB-COFDM modulators with an amplitude ratio of 1:0.5:0.25 are combined in an adder stage so that an even greater data quantity can be transmitted. As derived therefrom, 32 QAM-modulation may be achieved by a preceding logic means for conversion from 5 bits to 6 bits.

Generally, a higher-order modulator may be constructed from 4 PSK elements (DSR or DAB principle) with the degrees of freedom for the single modulator as to amplitude by insertion of an attenuator and as to phase by insertion of a phase shifter, and also with the degree of freedom as to the entire data capacity by providing a preceding logic means resulting in a choice of the modulation points.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A digital broadcasting transmitter network system having individual transmitting stations and operating on a DAB principle, in which digital programs to be broadcast through the individual transmitting stations subsequent to corresponding data reduction are coded and modulated in accordance with a COFDM technique, comprising:

the programs to be broadcast being at least one of digital sound programs and digital video programs;

for increasing a data quantity to be transmitted, at least two COFDM coders for producing COFDM signal packets, said at least two COFDM coders each having a 4 PSK modulator and an output; and adder stages, said outputs of said 4 PSK modulators being combined via said adder stages such that one of 8 PSK/2 AM modulation, 16 QAM modulation and 64 QAM modulation with more than four phase positions results.

2. The digital broadcasting transmitter network system claimed in claim 1, wherein data-reduced data of a digital television signal up to HDTV-grade is transmitted through said COFDM signal packets.

3. The digital broadcasting transmitter network system claimed in claim 1, wherein said digital broadcasting transmitter network system further comprises, for feeding the digital programs to the individual transmitting stations of the digital broadcasting transmitter network system operating on the DAB principle, a DSR satellite link for transmitting an increased data quantity.

4. The digital broadcasting transmitter network system claimed in claim 3, wherein a plurality of COFDM signal packets processed in accordance with the DAB principle is transmitted via the DSR satellite link to the individual transmitting stations.

5. The digital broadcasting transmitter network system claimed in claim 4, wherein four respective COFDM signal packets are combined to form a channel signal and wherein 90° components of an IF-carrier of the DSR satellite link are frequency modulated or phase modulated with two such channel signals.

6. The digital broadcasting transmitter network system claimed in claim 3, wherein the COFDM signal packets are transmitted via the DSR satellite link to the individual transmitting stations in accordance with the DSR, in which in a 4 PSK modulator an IF-carrier is modulated which is subsequently converted in a frequency converter to a transmission frequency of the DSR satellite link.

7. The digital broadcasting transmitter network system claimed in claim 6, wherein a plurality of 2.4 Mbit/s data streams, which have been processed in accordance with the DAB principle, are fed through a data multiplexer to inputs for two 10.24 Mbit/s data streams of the 4 PSK modulator of the DSR satellite link.

8. The digital broadcasting transmitter network system claimed in claim 6, wherein a plurality of 1.2 to 2 Mbit/s data streams, which have been processed, are fed through a data multiplexer to inputs for two 10.24 Mbit/s data streams of the 4 PSK modulator of the DSR satellite link.

9. The digital broadcasting transmitter network system claimed in claim 3, wherein said digital broadcasting transmitter network system further comprises a DSR satellite link having a modulation mode that has more than four phase positions.

10. The digital broadcasting transmitter network system claimed in claim 9, wherein said digital broadcasting transmitter network system further comprises means for PSK modulation having more than four phase positions.

11. The digital broadcasting transmitter network system claimed in claim 9, wherein said digital broadcasting transmitter network system further comprises means for modulation according to a QAM principle.

12. The digital broadcasting transmitter network system claimed in claim 9, wherein said digital broadcasting transmitter network system further comprises a modulator composed of two 4 PSK modulators, and wherein data-reduced data streams are directly supplied to two 10.24 Mbit/s data stream inputs of each of the two 4 PSK modulators.

13. The digital broadcasting transmitter network system claimed in claim 6, wherein at least two DSR channels are simultaneously transmitted on a transponder of corresponding bandwidth.

14. The digital broadcasting transmitter network system claimed in claim 3, wherein said digital broadcasting transmitter network system further comprises: means for separately processing a plurality of data streams according to the DAB principle; means for modulating the data streams according to one of a narrowband DSR principle, PSK modulation having more than four phase positions and modulation according to a QAM principle; and means for transmitting the modulated data streams via the DSR satellite link in accordance with a Single-Channel-Per-Carrier method.

15. The digital broadcasting transmitter network system claimed in claim 13, wherein said digital broadcasting transmitter network system further comprises: means for separately processing at least two data streams according to one of the DSR principle; means for modulating the at least two data streams according to one of a PSK modulation having more than four phase positions and modulation according to a QAM principle; and means for transmitting the modulated data streams according to a Single-Channel-Per-Carrier method via the DSR satellite link.

16. A digital broadcasting transmitter network system having individual transmitting stations and operating on a DAB principle, in which digital programs to be broadcast through the individual transmitting stations subsequent to corresponding data reduction are coded and modulated in accordance with a COFDM technique, comprising:

the programs to be broadcast being at least one of digital sound programs and digital video programs;

for increasing a data quantity to be transmitted, means for distributing data of the digital programs to be broadcast to a plurality of COFDM signal packets;

means for simultaneously transmitting said plurality of COFDM signal packets through the individual transmitting stations;

at least two COFDM coders for producing COFDM signal packets of the plurality of COFDM signal packets, said at least two COFDM coders each having a 4 PSK modulator and an output; and adder stages, said outputs of said 4 PSK modulators being combined via said adder stages such that one of 8 PSK/2 AM modulation, 16 QAM modulation and 64 QAM modulation with more than four phase positions results.

17. The digital broadcasting transmitter network system claimed in claim 16, wherein said digital broadcasting transmitter network system further comprises two 4 PSK-COFDM coders/modulators for generating the COFDM signal packets, said coders/modulators operating with carriers offset by 45° relative to each other and having outputs thereof directly combined through an adder stage.

18. The digital broadcasting transmitter network system claimed in claim 16, wherein said digital broadcasting transmitter network system further comprises two 4 PSK-COFDM coders/modulators for generating the COFDM signal packets and having respective output signals that are combined in an adder stage with a ratio of amplitudes of said output signals of 1:0.5.

19. The digital broadcasting transmitter network system claimed in claim 16, wherein said digital broadcasting transmitter network system further comprises three PSK-COFDM coders/modulators for generating the COFDM signal packets and having respective output signals that are combined in an adder stage with a ratio of amplitudes of said output signals of 1:0.5:0.25.

20. The digital broadcasting transmitter network system claimed in claim 16, wherein said digital broadcasting transmitter network system further comprises eight COFDM signal packets, each having a width of 1.5 MHz, transmitted on two television-band channels.

21. The digital broadcasting transmitter network system claimed in claim 16, wherein a local radio program is transmitted via at least one of said COFDM signal packets and wherein the digital broadcasting transmitter network system has receivers that are adapted to be switched automatically by switching information to said local program.

22. The digital broadcasting transmitter network system claimed in claim 16, wherein data-reduced data of a digital television signal up to HDTV-grade is transmitted through said plurality of COFDM signal packets.

23. The digital broadcasting transmitter network system claimed in claim 16, wherein said digital broadcasting transmitter network system further comprises, for feeding the digital programs to the individual transmitting stations of the digital broadcasting transmitter network system operating on the DAB principle, a DSR satellite link for transmitting an increased data quantity.

* * * * *